United States Patent
Kwon et al.

(10) Patent No.: US 9,853,456 B2
(45) Date of Patent: Dec. 26, 2017

(54) WIRELESS POWER TRANSMISSION APPARATUS AND ENERGY CHARGING APPARATUS

(71) Applicant: Samsung Electronics Co., Ltd., Suwon-si (KR)

(72) Inventors: Ui Kun Kwon, Hwaseong-si (KR); Sang Joon Kim, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 14/328,432

(22) Filed: Jul. 10, 2014

(65) Prior Publication Data

US 2015/0180240 A1    Jun. 25, 2015

(30) Foreign Application Priority Data

Dec. 24, 2013    (KR) .................. 10-2013-0162136

(51) Int. Cl.
| | |
|---|---|
| H01F 27/42 | (2006.01) |
| H01F 37/00 | (2006.01) |
| H01F 38/00 | (2006.01) |
| H02J 5/00 | (2016.01) |
| H04B 5/00 | (2006.01) |
| H02J 50/12 | (2016.01) |

(52) U.S. Cl.
CPC .............. *H02J 5/005* (2013.01); *H02J 50/12* (2016.02); *H04B 5/0037* (2013.01)

(58) Field of Classification Search
CPC .. H02J 5/005; H02J 7/025; H02J 17/00; H02J 50/12; H02J 50/10; H02J 50/80; H02J 50/90; H02J 50/60; H02J 50/40; H02J 50/20; H02J 2007/0096; H02J 7/0042; H02J 50/00; H02J 50/27
USPC ........................................................ 307/104
See application file for complete search history.

(56) References Cited

U.S. PATENT DOCUMENTS

| | | | |
|---|---|---|---|
| 8,030,887 | B2 | 10/2011 | Jung |
| 8,258,653 | B2 * | 9/2012 | Kitamura ............... H02J 5/005 |
| | | | 307/104 |
| 2009/0206791 | A1 | 8/2009 | Jung |

(Continued)

FOREIGN PATENT DOCUMENTS

| | | |
|---|---|---|
| EP | 1 432 097 A1 | 6/2004 |
| JP | 7-229928 A | 8/1995 |

(Continued)

OTHER PUBLICATIONS

European Office Action dated Jun. 6, 2016, in counterpart European Application No. 14 189 196.0 (6 pages, in English).

(Continued)

*Primary Examiner* — Jared Fureman
*Assistant Examiner* — Esayas Yeshaw
(74) *Attorney, Agent, or Firm* — NSIP Law

(57) ABSTRACT

A wireless power transmission apparatus includes a resonator configured to transmit power through a resonance with another resonator, a switch configured to connect the resonator to a power source, a setting unit configured to set a target amount of current to flow in the resonator, and a control unit configured to control the switch based on the target amount of current.

24 Claims, 32 Drawing Sheets

(56) References Cited

U.S. PATENT DOCUMENTS

| | | | | |
|---|---|---|---|---|
| 2010/0271012 | A1* | 10/2010 | Patterson | G01B 7/004 324/207.15 |
| 2012/0161531 | A1* | 6/2012 | Kim | H02J 7/0004 307/104 |
| 2012/0242158 | A1 | 9/2012 | Lee et al. | |
| 2012/0274261 | A1* | 11/2012 | Dwersteg | H02P 27/10 318/696 |
| 2012/0313447 | A1* | 12/2012 | Park | H02J 5/005 307/104 |
| 2013/0059533 | A1 | 3/2013 | Kwon et al. | |
| 2013/0069442 | A1 | 3/2013 | Kim et al. | |
| 2013/0127405 | A1* | 5/2013 | Scherer | H02J 7/025 320/108 |
| 2014/0084688 | A1* | 3/2014 | Tzanidis | H01F 38/14 307/42 |
| 2015/0137746 | A1 | 5/2015 | Lee et al. | |

FOREIGN PATENT DOCUMENTS

| | | | |
|---|---|---|---|
| KR | 10-2007-0104777 | A | 10/2007 |
| KR | 10-2011-0065969 | A | 6/2011 |
| KR | 10-2012-0135050 | A | 12/2012 |
| KR | 10-2012-0135086 | A | 12/2012 |
| WO | WO 2013/172630 | A1 | 11/2013 |

OTHER PUBLICATIONS

Liu, Y. et al., "A novel primary-side controlled contactless battery charger," IEEE 7th International Conference on Power Electronics and Drive Systems (PEDS), 2007 (pp. 320-324).
Extended European Search Report dated Mar. 9, 2015 in European Application No. 14189196.0 (9 pages).
European Search Report dated Mar. 31, 2017 in corresponding European Application No. 14189196.0 (4 pages in English).

* cited by examiner

WIRELESS POWER TRANSMISSION APPARATUS AND ENERGY CHARGING APPARATUS

CROSS-REFERENCE TO RELATED APPLICATION

This application claims the benefit under 35 USC 119(a) of Korean Patent Application No. 10-2013-0162136, filed on Dec. 24, 2013, in the Korean Intellectual Property Office, the entire disclosure of which is incorporated herein by reference for all purposes.

BACKGROUND

1. Field

The following description relates to a wireless power transmission apparatus and an energy charging apparatus.

2. Description of Related Art

Due to an increase in various electronic devices, including mobile devices, research on wireless power transmission has been initiated in an effort to overcome various issues, such as an increasing inconvenience of wired power supplies, and limits to existing battery capacities. In particular, research has been concentrated on near-field wireless power transmission. Near-field wireless power transmission refers to wireless power transmission in which a distance between a transmission coil and a reception coil is relatively short compared to a wavelength at an operation frequency. In the near-field wireless power transmission, a resonator isolation (RI) system may be used. The RI system using resonance characteristics may include a source device configured to supply power, and a target device configured to receive the supplied power. When wireless power is transmitted and received, the source device and the target device may share control information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power transmission apparatus including a resonator configured to transmit power through a resonance with another resonator, a switch configured to connect the resonator to a power source, a setting unit configured to set a target amount of current to flow in the resonator, and a control unit configured to control the switch based on the target amount of current.

The apparatus may further include a sensor configured to sense an actual amount of current flowing in the resonator. The control unit may be configured to control the switch by comparing the actual amount of current to the target amount of current.

The setting unit may be configured to set the target amount of current based on data to be transmitted to the other resonator.

The setting unit may be configured to set the target amount of current based on a charging and discharging cycle of the resonator.

The setting unit may be configured to set a first target amount of current corresponding to first data in a first symbol duration, and set a second target amount of current corresponding to second data in a second symbol duration. The first symbol duration may correspond to a first charging and discharging cycle of the resonator, and the second symbol duration may correspond to a second charging and discharging cycle of the resonator.

The setting unit may be configured to set the target amount of current based on an actual amount of current flowing in the resonator.

The setting unit may be further configured to analyze any one or any combination of whether the other resonator is present, a power reception state of the other resonator, and an amount of residual energy of the resonator, based on an actual amount of current flowing in the resonator.

The setting unit may be configured to set the target amount of current based on a resonance waveform of the resonator.

The setting unit may be further configured to analyze a feedback received from the other resonator based on a resonance waveform of the resonator.

The setting unit may be configured to set the target amount of current based on at least two of a resonance waveform of the resonator, an actual amount of current flowing in the resonator, and data to be transmitted to the other resonator.

The setting unit may be configured to select one of predetermined candidate target amounts of current as the target amount of current.

In another general aspect, there is provided an energy charging apparatus including an inductor configured to store energy, a switch configured to connect the inductor to a power source, a setting unit configured to set a target amount of energy to be stored in the inductor, and a control unit configured to control the switch based on the target amount of energy.

The apparatus may further include a sensor configured to sense an actual amount of current flowing in the inductor. The control unit may be configured to control the switch by comparing the actual amount of current to a target amount of current to flow in a resonator that corresponds to the target amount of energy.

The inductor may be included in a resonator configured to transmit power through a resonance with another resonator.

The setting unit may be configured to set the target amount of energy based on data to be transmitted through the inductor.

The setting unit may be configured to set the target amount of energy based on an actual amount of current flowing in the inductor.

The setting unit may be configured to set the target amount of energy based on a waveform of a voltage applied between both ends of the inductor.

The setting unit may be configured to set the target amount of energy based on at least two of a waveform of a voltage applied between both ends of the inductor, an actual amount of current flowing in the inductor, and data to be transmitted through the inductor.

In still another general aspect, there is provided a method of controlling a wireless power transmission apparatus including a resonator configured to transmit power through a resonance with another resonator, the method including setting a target amount of current to flow in the resonator based on any one or any combination of a resonance waveform of the resonator, an actual amount of current flowing in the resonator, and data to be transmitted to the other resonator, and determining whether current is allowed to flow in the resonator based on a charging and discharging cycle of the resonator.

A non-transitory computer-readable storage medium may store a program including instructions to cause a computer to perform the method.

In yet another general aspect, an apparatus includes a resonator configured to transmit power to another resonator, and a setting unit configured to set a target amount of current to flow in the resonator based on any one or any combination of data to be transmitted to the other resonator, an actual amount of current flowing in the resonator, and a resonance waveform of the resonator.

The apparatus may further include a switch configured to connect the resonator to a power source, and a control unit configured to control the switch based on the target amount of current.

The apparatus may further include a data generator configured to generate the data to be transmitted to the other resonator.

The apparatus may further include a sensor connected in series to the resonator, and configured to sense the actual amount of current flowing in the resonator.

The apparatus may further include a sensor configured to sense the resonance waveform of the resonator.

The apparatus may further include a sensor connected in parallel to the resonator, and configured to sense the actual amount of current flowing in the resonator.

Other features and aspects will be apparent from the following detailed description, the drawings, and the claims.

Figure 1:
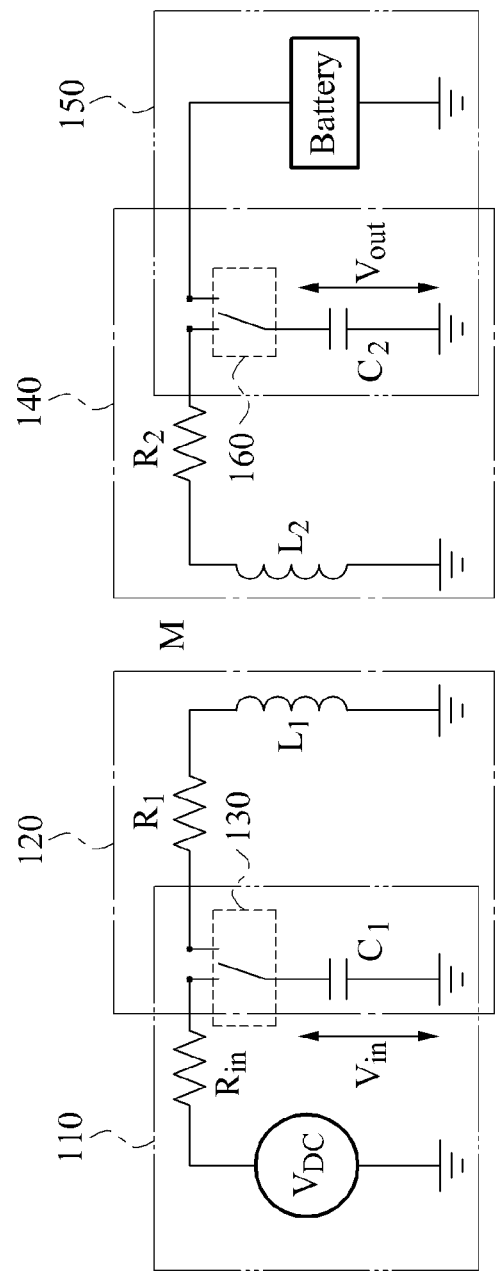
FIGS. 1 and 2 are diagrams illustrating examples of an equivalent circuit of a wireless power transmission system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be applied to various systems needing wireless power. The wireless power transmission system may be used in a system enabling use of wireless power, for example, a mobile device, a wireless television (TV), and/or other systems known to one of ordinary skill in the art. Additionally, the wireless power transmission system may be applicable in a bio-healthcare field, and may be used to remotely transmit power to a device inserted into a human body, or used to wirelessly transmit power to a bandage-shaped device for measurement of a heart rate.

The wireless power transmission system may also be applied to a device, such as, for example, a low-power sensor operating using a relatively small amount of power and with relatively low power consumption. Additionally, the wireless power transmission system may be used to remotely control a data storage device without a power source. The wireless power transmission system may be applied to a system configured to supply power to a data storage device to remotely operate the data storage device, and to wirelessly request data stored in the data storage device.

The wireless power transmission system may receive energy supplied from a power supply unit, and may store the energy in a source resonator, to generate a signal. The wireless power transmission system may induce the source resonator to self-resonate by powering off a switch that electrically connects the source resonator to the power supply unit. When a target resonator with the same resonant frequency as the self-resonating source resonator is disposed within a distance close enough to resonate with the source resonator, a mutual resonance phenomenon may occur between the source resonator and the target resonator. In examples herein, the source resonator may refer to a resonator that receives energy from a power supply unit, and the target resonator may refer to a resonator that receives energy from the source resonator due to the mutual resonance phenomenon. The wireless power transmission system may be defined as a resonator isolation (RI) system.

Figure 2:
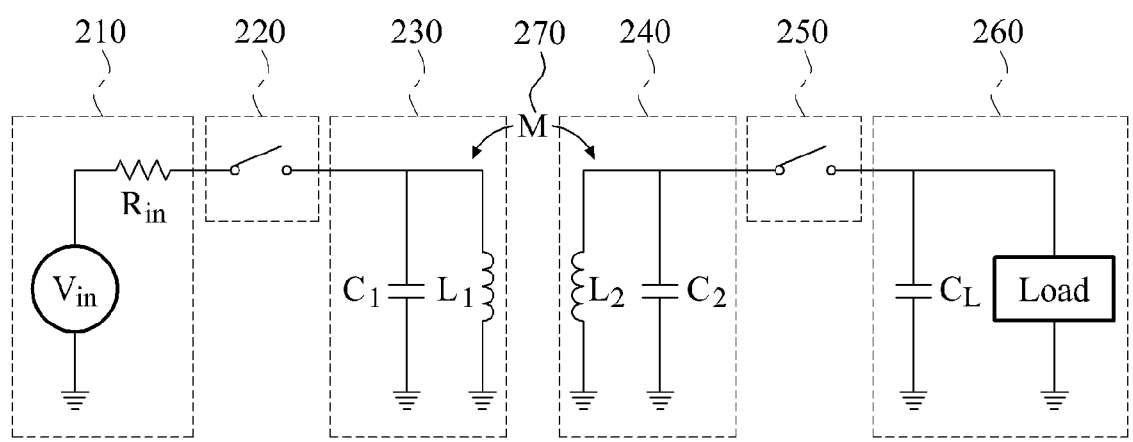

FIGS. 1 and 2 are diagrams illustrating examples of an equivalent circuit of a wireless power transmission system. FIG. 1 illustrates an example of an RI system corresponding to, for example, a capacitive charging (CC) scheme. Referring to FIG. 1, the wireless power transmission system includes a source-target structure including a source device and a target device. The wireless power transmission system includes a wireless power transmission apparatus corresponding to the source device, and a wireless power reception apparatus corresponding to the target device.

In more detail, the wireless power transmission apparatus includes a power input unit 110, a power transmitting unit 120, a switch unit 130, and a capacitor $C_1$. The power input unit 110 stores energy in the capacitor $C_1$, using a power supply unit generating an input voltage $V_{DC}$. The switch unit 130 connects the capacitor $C_1$ to the power input unit 110, while the energy is transmitted from the power supply unit and stored in the capacitor $C_1$. To discharge the stored energy, the switch unit 130 disconnects the capacitor $C_1$ from the power input unit 110, and connects the capacitor $C_1$ to the power transmitting unit 120. The switch unit 130 prevents the capacitor $C_1$ from being connected to the power input unit 110 and the power transmitting unit 120 at the same time.

The power transmitting unit 120 transfers electromagnetic energy to the receiving unit 140, through mutual resonance. In more detail, the power transmitting unit 120 transfers the electromagnetic energy through the mutual resonance between a transmission coil $L_1$ of the power transmitting unit 120 and a reception coil $L_2$ of the receiving unit 140. A level of the mutual resonance between the transmission coil $L_1$ and the reception coil $L_2$ is affected by mutual inductance M between the transmission coil $L_1$ and the reception coil $L_2$. The mutual inductance M is a coefficient proportional to a voltage induced on a secondary side due to a change in current over time on a primary side, and may be measured in Henries (H).

The power input unit 110 includes the power supply unit generating the input voltage $V_{DC}$, an internal resistor $R_{in}$, and the capacitor $C_1$, and the power transmitting unit 120 includes a resistor $R_1$, the transmission coil $L_1$, and the capacitor $C_1$ that are included in the source resonator. The capacitor $C_1$ may belong to the power input unit 110 or the power transmitting unit 120, depending on an operation of the switching unit 130. Additionally, the switch unit 130 includes at least one switch. For example, the switch may include an active element enabling an on/off function. In FIG. 1, $R_1$, $L_1$, and $C_1$ represent a resistance, an inductance, and a capacitance, respectively, of the source resonator. A voltage applied to the capacitor $C_1$ among the input voltage $V_{DC}$ is represented by $V_{in}$.

The wireless power reception apparatus includes a receiving unit 140, a power output unit 150, a switch unit 160, and a capacitor $C_2$. The receiving unit 140 receives the electromagnetic energy from the power transmitting unit 120, and stores the received electromagnetic energy in the capacitor $C_2$. The switch unit 160 connects the capacitor $C_2$ to the receiving unit 140, while the electromagnetic energy is transmitted from the power transmitting unit 120 and stored in the capacitor $C_2$. To discharge the stored energy, the switch unit 160 disconnects the capacitor $C_2$ from the receiving unit 140, and connects the capacitor $C_2$ to the power output unit 150. The power output unit 150 transfers the energy stored in the capacitor $C_2$ to a load, for example, a battery. The switch unit 160 prevents the capacitor $C_2$ from being connected to the receiving unit 140 and the power output unit 150 at the same time.

In more detail, the receiving unit 140 receives the electromagnetic energy through the mutual resonance between the reception coil $L_2$ of the receiving unit 140 and the transmission coil $L_1$ of the power transmitting unit 120. The receiving unit 140 charges the capacitor $C_2$ connected to the reception coil $L_2$, with the received electromagnetic energy. The power output unit 150 transfers the energy used to charge the capacitor $C_2$ to the load, for example, the battery. As another example, the power output unit 150 may transfer the energy to a target device requiring power, instead of to the battery.

The receiving unit 140 includes a resistor $R_2$, the reception coil $L_2$, and the capacitor $C_2$ that are included in a target resonator, and the power output unit 150 includes the capacitor $C_2$ and the battery. The capacitor $C_2$ may belong to the receiving unit 140 or the power output unit 150, depending on an operation of the switching unit 160. The switch unit 160 includes at least one switch. In FIG. 1, $R_2$, $L_2$, and $C_2$ represent a resistance, an inductance, and a capacitance, respectively, of the target resonator. A voltage applied to the capacitor $C_2$ among the electromagnetic energy received by the reception coil $L_2$ is represented by $V_{out}$.

The RI system enables power to be transmitted in an example in which the power input unit 110 is physically separated from the power transmitting unit 120, and the receiving unit 140 is physically separated from the power output unit 150. The RI system may have various differences in comparison to a conventional power transmission system using impedance matching. The RI system does not need a power amplifier because power may be supplied from a direct current (DC) source (e.g., the power supply unit generating the input voltage $V_{DC}$) directly to the source resonator. Further, the RI system does not require a rectifying operation of a rectifier because energy is captured from energy used to charge the capacitor $C_2$ of the wireless power reception apparatus. Also, a transmission efficiency is not sensitive to a change in a distance between the wireless power transmission apparatus and the wireless power reception apparatus because there is no need to perform impedance matching. Additionally, the RI system may be easily extended from the wireless power transmission system including a single transmission apparatus and a single reception apparatus to a wireless power transmission system including a plurality of transmission apparatuses and a plurality of reception apparatuses.

FIG. 2 illustrates another example of an RI system corresponding to, for example, an inductive charging (IC) scheme. Referring to FIG. 2, the wireless power transmission system includes a source-target structure including a source device and a target device. The wireless power transmission system includes a wireless power transmission apparatus corresponding to the source device, and a wireless power reception apparatus corresponding to the target device.

The wireless power transmission apparatus includes a power charging unit 210, a switching unit 220, and a transmitting unit 230. In this example, the power charging unit 210 includes a power supply unit $V_{in}$ and an internal resistor $R_{in}$. The transmitting unit 230 includes a capacitor $C_1$ and an inductor $L_1$. In FIG. 2, the capacitor $C_1$ and the inductor $L_1$ are referred to as a source resonator. In this example, the source resonator functions as the transmitting unit 230. The transmitting unit 230 transmits energy stored in the source resonator to a target resonator, through mutual resonance M 270 between the source resonator and the target resonator.

The switching unit 220 includes a switch, and turns on (e.g., closes) the switch to enable power to be supplied from the power charging unit 210 to the transmitting unit 230. In more detail, a voltage from the power supply unit $V_{in}$ is applied to the capacitor $C_1$, and a current is applied to the inductor $L_1$. For example, when the source resonator reaches a steady state due to the voltage applied from the power supply unit $V_{in}$, the voltage applied to the capacitor $C_1$ may include a value of '0', and the current flowing in the inductor $L_1$ may include a value of '$V_{in}/R_{in}$'. In the steady state, the source resonator may be charged with power, using the current applied to the inductor $L_1$.

When the power used to charge the source resonator in the steady state reaches a predetermined value or a maximum value, the switching unit 220 turns off (e.g., opens) the switch. The switching unit 220 may set information of the predetermined value. For example, when a current flowing in the transmitting unit 230 is identical to a predetermined current, the switching unit 220 may turn off the switch.

By turning off the switch, the switching unit 220 separates the power charging unit 210 from the transmitting unit 230. When the power charging unit 210 is separated from the transmitting unit 230, the source resonator starts self-resonating between the capacitor $C_1$ and the inductor $L_1$. Energy stored in the source resonator is transferred to the target resonator, through the mutual resonance M 270 between the source resonator and the target resonator. The mutual inductance M 270 is a coefficient proportional to a voltage induced on a secondary side due to a change in current over time on a primary side, and may be measured in Henries (H). A resonant frequency $f_1$ of the source resonator may be the same as a resonant frequency $f_2$ of the target resonator. Additionally, a value of the resonant frequency $f_1$, and a value of resonant frequency $f_2$, may be determined based on the following equations.

$$f_1 = \frac{1}{2\pi\sqrt{L_1 C_1}}, f_2 = \frac{1}{2\pi\sqrt{L_2 C_2}} \qquad (1)$$

In Equations (1), $L_1$ denotes an inductance of the inductor $L_1$, $C_1$ denotes a capacitance of the capacitor $C_1$, $L_2$ denotes an inductance of an inductor $L_2$ of the target resonator, and $C_2$ denotes a capacitance of a capacitor $C_2$ of the target resonator.

The wireless power reception apparatus includes a charging unit 240, a switching unit 250, and a power output unit 260. The charging unit 240 includes the capacitor $C_2$ and the inductor $L_2$. In FIG. 2, the capacitor $C_2$ and the inductor $L_2$ are referred to as the target resonator. The charging unit 240 receives the energy stored in the source resonator via the target resonator, through the mutual resonance M 270 between the source resonator and the target resonator. The power output unit 260 includes a load and a capacitor $C_L$.

The switching unit 250 includes a switch, and turns off (e.g., opens) the switch. By turning off the switch, the switching unit 250 separates the charging unit 240 from the power output unit 260. During the mutual resonance M 270 between the source resonator and the target resonator, the source resonator is separated from the power supply unit $V_{in}$ by the switching unit 220 including the switch being open, and the target resonator is separated from the load and the capacitor $C_L$ by the switching unit 250 including the switch being open. The energy stored in the source resonator is transferred to the target resonator, through the mutual resonance M 270. In more detail, the energy stored in the source resonator charges the capacitor $C_2$ and the inductor $L_2$ of the charging unit 240, through the mutual resonance M 270. The resonant frequency $f_1$ of the source resonator may be the same as the resonant frequency $f_2$ of the target resonator.

When the energy used to charge the target resonator reaches a predetermined value or a maximum value, the switching unit 250 turns on (e.g., closes) the switch. The switching unit 250 may set information of the predetermined value. By turning on the switch, the switching unit 250 connects the capacitor $C_L$ to the charging unit 240, and the resonant frequency of the target resonator is changed. A value of the changed resonant frequency $f_2$ of the target resonator may be determined based on the following equation.

$$f_2' = \frac{1}{2\pi\sqrt{L_2(C_2 + C_L)}} \qquad (2)$$

In Equation (2), $C_L$ denotes a capacitance of the capacitor $C_L$.

Accordingly, the mutual resonance M 270 between the source resonator and the target resonator is terminated. For example, when the changed resonant frequency $f_2$ is much smaller than the resonant frequency $f_2$ based on a Q-factor of the target resonator, the mutual resonance M 270 is removed. Additionally, the charging unit 240 transfers power used to charge the capacitor $C_2$ and the inductor $L_2$ to the power output unit 260, which transfers the power to the load. For example, the power output unit 260 may transfer the power to the load, using a scheme suitable for the load. For example, the power output unit 260 may regulate voltage to rated voltage that is needed by the load, and may transfer power to the load based on the regulated voltage.

When the energy used to charge the target resonator is less than a predetermined value, the switching unit 250 turns off the switch. The charging unit 240 may recharge the target resonator with energy, using the mutual resonance M 270 between the source resonator and the target resonator. During the mutual resonance M 270 between the source resonator and the target resonator, the switch of the switching unit 250 is not connected between the charging unit 240 and the power output unit 260. Accordingly, it is possible to prevent transmission efficiency from being reduced due to a connection to the switch.

A scheme of controlling a point in time of capturing energy stored in a target resonator of FIG. 2 may be performed more easily than a scheme of transferring energy stored in a capacitor of FIG. 1. In the scheme of transferring the energy stored in a capacitor, only the energy in the capacitor is captured. However, in a scheme of changing a resonant frequency of the target resonator and capturing the energy stored in the target resonator, the energy stored in an inductor and a capacitor of the target resonator is captured. Accordingly, a degree of freedom for the point in time of capturing the energy may be improved.

To transmit power or data, a transmission apparatus in an RI system may repeatedly charge a source resonator with energy and discharge energy through a connection to a switch. In various examples herein, a single charge and discharge of energy may be referred to as a single symbol. To receive energy or data from the transmission apparatus, a reception apparatus in the RI system may operate a switch of the reception apparatus based on an operation period of the switch of the transmission apparatus that repeatedly performs charging and discharging.

To receive power or data from the transmission apparatus without an error, the reception apparatus may need to know when the switch of the transmission apparatus is powered off, when the switch of the transmission apparatus is powered on, when a mutual resonance is started, and when energy stored in the target resonator includes a peak value. A method of acquiring information regarding an on/off time of the switch of the transmission apparatus, and matching an on/off time of the switch of the reception apparatus to the acquired information, may be referred to as a time synchronization.

To transfer information, the RI system may use mutual resonance between the source resonator and the target resonator. For example, the transmission apparatus may switch between states in which mutual resonance occurs and does not occur for a predetermined time interval, through an operation of supplying and not supplying energy from a power supply to the source resonator for the predetermined time interval. In this example, the transmission apparatus may switch the mutual resonance by switching a connection between the source resonator and the power supply. The transmission apparatus may assign information to each of the states. For example, the transmission apparatus may assign a bit "1" to the state in which the mutual resonance occurs, and assign a bit "0" to the state in which the mutual resonance does not occur. The predetermined time interval may be defined, for example, as a single symbol duration.

The reception apparatus may switch between the states in which mutual resonance occurs and does not occur, through an operation of tuning and detuning a resonant frequency of the target resonator to and from a resonant frequency of the source resonator, for the predetermined time interval. In this example, the reception apparatus may assign information to each of the states. For example, the reception apparatus may assign a bit "1" to the state in which the mutual resonance occurs, and assign a bit "0" to the state in which the mutual resonance does not occur.

In a scheme of transferring information in a symbol unit, symbols may need to be synchronized in advance. To synchronize symbols, the reception apparatus or the transmission apparatus may perform synchronization matching. When the synchronization matching is performed, data may be bidirectionally transmitted between the transmission apparatus and the reception apparatus by a protocol that is set in advance.

Figure 3A:
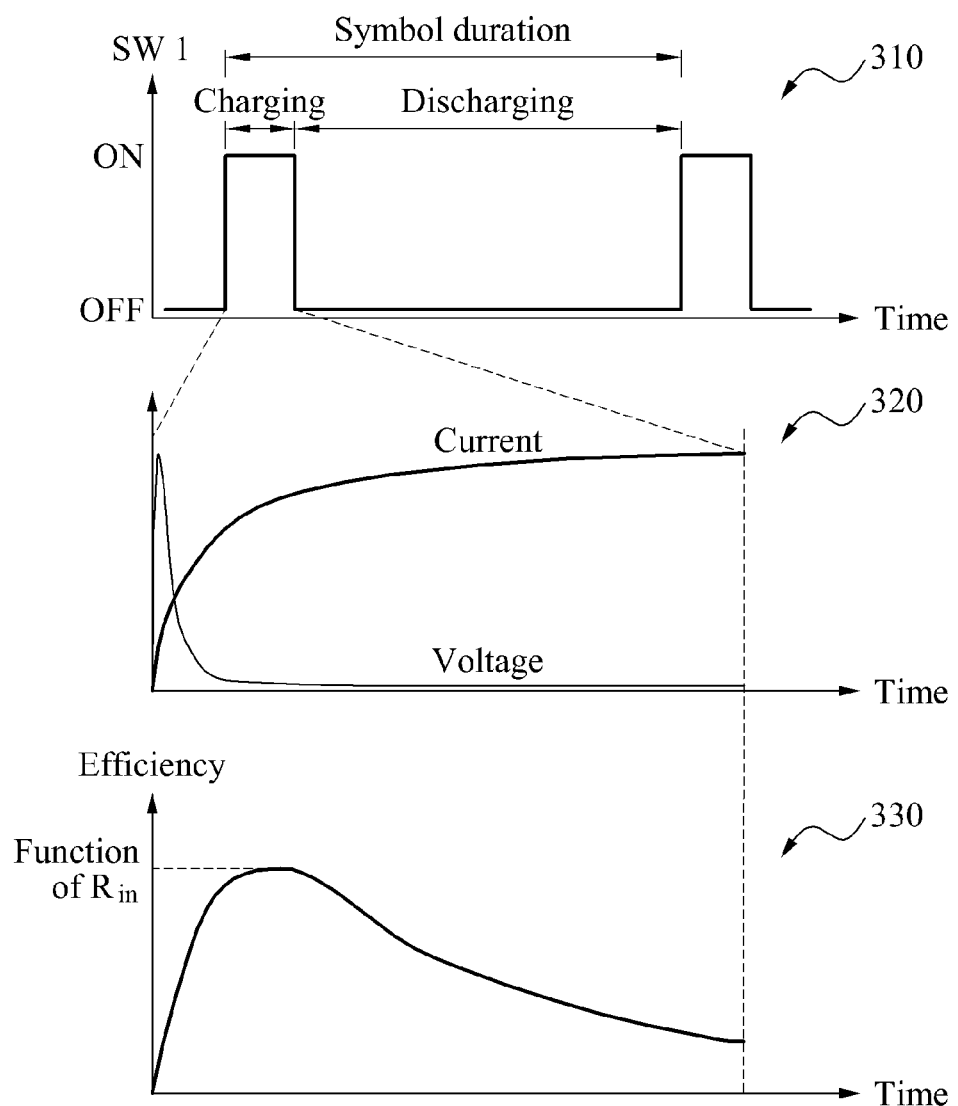
FIGS. 3A through 3C are graphs illustrating examples of an operation of a circuit in a wireless power transmission apparatus for a symbol duration corresponding to a charging and discharging cycle.
Figure 3B:
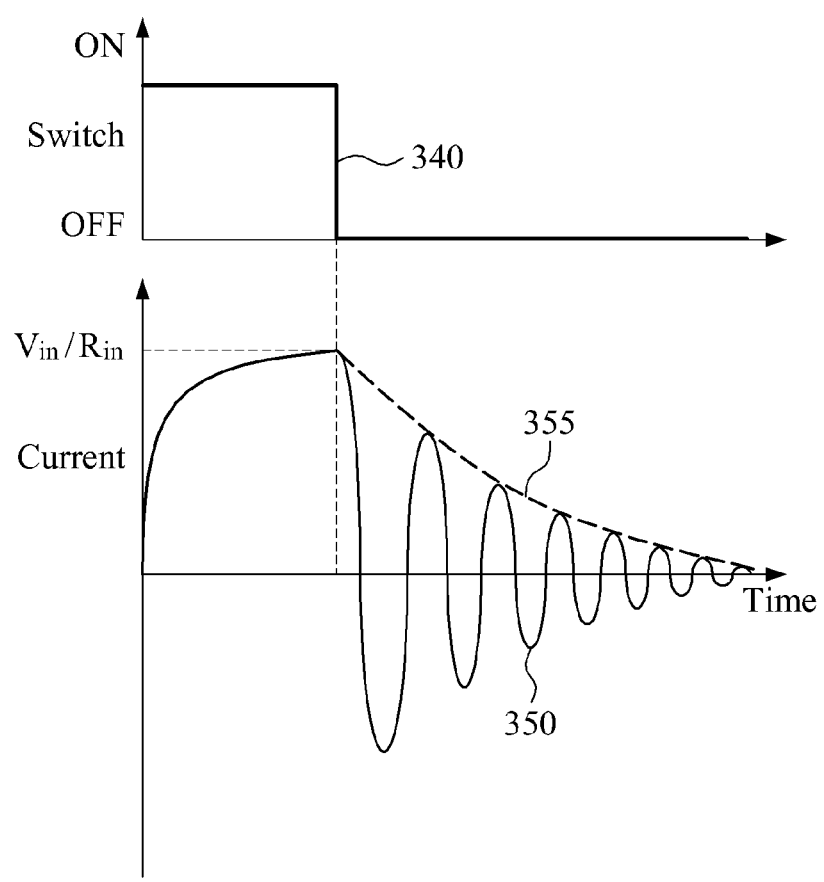
Figure 3C:
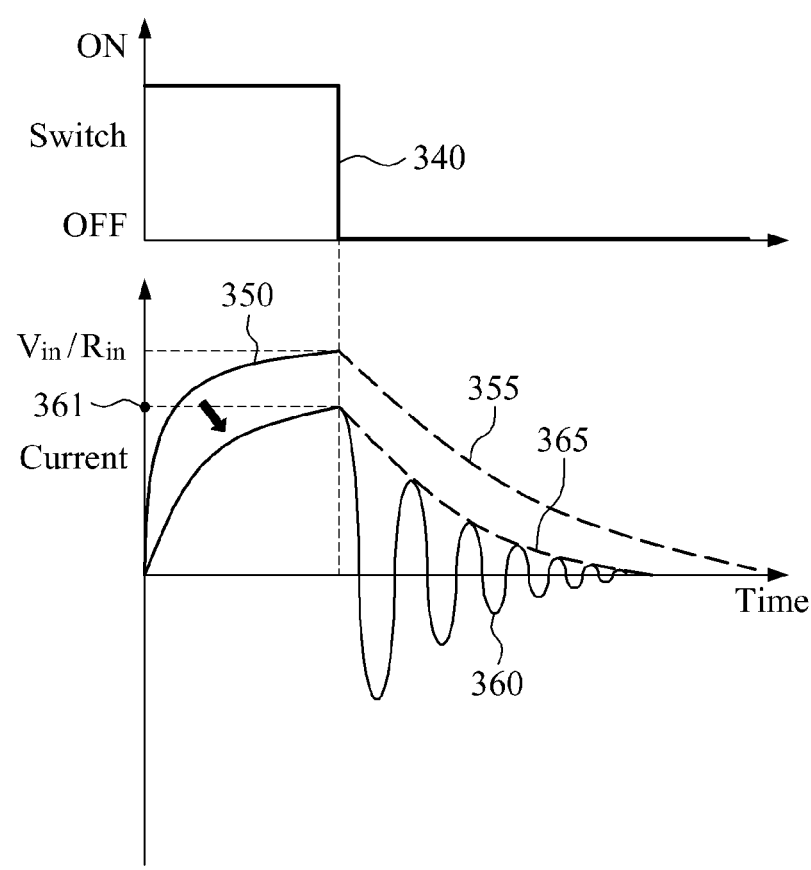

FIGS. 3A through 3C are graphs illustrating examples of an operation of a circuit in a wireless power transmission apparatus for a symbol duration corresponding to a charging and discharging cycle. FIG. 3A illustrates an example of a charging efficiency according to an operation of a switch SW 1 in the wireless power transmission apparatus. A series of graphs provided in FIG. 3A will be described based on an RI system corresponding to an IC scheme.

Referring to FIG. 3A, a graph 310 illustrates an energy charging time interval according to a turning on and off of the switch SW 1 in the wireless power transmission apparatus. The wireless power transmission apparatus may transmit energy to a wireless power reception apparatus by repeatedly performing charging and discharging. A single charging and discharging of energy corresponds to a single symbol duration. When the switch of the wireless power transmission apparatus is turned on, a source resonator may be charged with energy. When the switch SW 1 of the wireless power transmission apparatus is turned off, the energy in the source resonator may be discharged.

A graph 320 illustrates an amount of current and an amount of voltage over time during the energy charging time interval of the graph 310. When charging is initiated, voltage at the source resonator of the wireless power transmission apparatus decreases sharply. When the source resonator reaches a steady state, voltage applied to a capacitor of the source resonator may have a value of "0". When charging is initiated, current at the source resonator of the wireless power transmission apparatus increases sharply. When the source resonator reaches the steady state, current flowing in an inductor of the source resonator may reach a predetermined value, for example, $I_L = V_{in}/R_{in}$. In the steady state, the source resonator may be charged with energy of $LI_L^2/2$ through the current applied to the inductor. In this example, L denotes an inductance of the inductor of the source resonator.

A graph 330 illustrates an energy charging efficiency during the energy charging time interval. The energy charging efficiency may be defined by an amount of energy used for charging over a total amount of supplied energy. An amount of energy used to charge the inductor may correspond to $LI_L^2/2$. When the input voltage $V_{in}$ is constant, $I_L$ may be calculated using a function of the input resistor $R_{in}$. Thus, the amount of energy used for charging may be calculated using the function of the input resistor $R_{in}$. The total amount of supplied energy may be calculated based on a sum of the amount of energy used for charging and an amount of lost energy. Energy may be lost in a form of thermal energy at the input resistor $R_{in}$. Accordingly, the lost energy may also be calculated using the function of the input resistor $R_{in}$. The energy charging efficiency during the energy charging time interval may be calculated using the function of the input resistor $R_{in}$.

Referring to the graph 330, when energy charging is initiated, an amount of current flowing in the inductor may increase. The higher the amount of energy used for charging, the higher the energy charging efficiency. When the source resonator reaches a steady state, the amount of current flowing in the inductor may no longer increase. Thus, the amount of energy used to charge the source resonator may no longer increase. However, although the source resonator reaches the steady state, current may continuously flow in the input resistor $R_{in}$ and thus, power may be lost continuously. Accordingly, the energy charging efficiency may reach a peak, and then decrease gradually over time.

Referring to the graphs 310 through 330, the energy charging efficiency may be increased by reducing the function of the input resistor $R_{in}$, by reducing a length of the energy charging time interval, or by precisely controlling the switch SW 1 of the wireless power transmission apparatus.

FIGS. 3B and 3C illustrate examples of a change in an amount of charging current based on whether an energy receiving end is present. Referring to FIG. 3B, when a switch signal 340 is turned on, an amount of current 350 may rapidly increase, and then converge to $V_{in}/R_{in}$. In an interval in which the switch signal 340 is turned on, the amount of current 350 may correspond to an amount of current flowing in the inductor $L_1$ included in the transmitting unit 230 in a case in which the switching unit 220 of FIG. 2 is turned on. When the switch signal 340 is turned off, the amount of current 350 may initiate resonating with a resonant frequency and positive and negative amplitudes. An envelope 355 of the amount of current 350 may gradually decrease from $V_{in}/R_{in}$ to "0". In an interval in which the switch signal 340 is turned off, the amount of current 350 may correspond to an amount of current flowing in the inductor $L_1$ included in the transmitting unit 230 when the switching unit 220 of FIG. 2 is turned off.

Referring to FIG. 3C, when a target resonator coupled to the source resonator is present, a form of energy injected into a transmitting end may be changed. For example, in an interval in which the switch signal 340 is turned on, an amount of current 360 may converge to $V_{in}/R_{in}$ slower than the amount of current 350 because the source resonator may be charged relatively slowly in a case in which a target resonator is coupled to the source resonator. In this example, the amount of current 360 may reach a value 361 less than $V_{in}/R_{in}$ in the same interval in which the switch signal 340 is turned on. Thus, the source resonator may not be charged with a desired amount of energy. When the switch signal 340 is turned off, the amount of current 360 may initiate resonating with a resonant frequency and positive and negative amplitudes. In this example, an envelope 365 of the amount of current 360 may gradually decrease from the value 361 to "0".

The wireless power transmission apparatus may control an amount of current to flow in the source resonator, using an active device, rather than a passive device, for example, the input resistor $R_{in}$. The wireless power transmission apparatus may control the amount of current to flow in the source resonator, using an exquisitely controllable switch. The wireless power transmission apparatus may significantly reduce an amount of energy lost at the input resistor $R_{in}$. The wireless power transmission apparatus may dynamically control an amount of energy used to charge the source resonator by dynamically setting a target amount of current desired to flow in the source resonator based on various items of information. The wireless power transmission apparatus may dynamically control the amount of energy used to charge the source resonator, thereby transmitting power and data to a target resonator. The wireless power transmission apparatus may receive a feedback of an actual amount of current flowing in the source resonator, thereby controlling a switch more exquisitely. The wireless power transmission apparatus may receive information fed back from a target resonator, and dynamically control the source resonator based on the received information.

Figure 4:
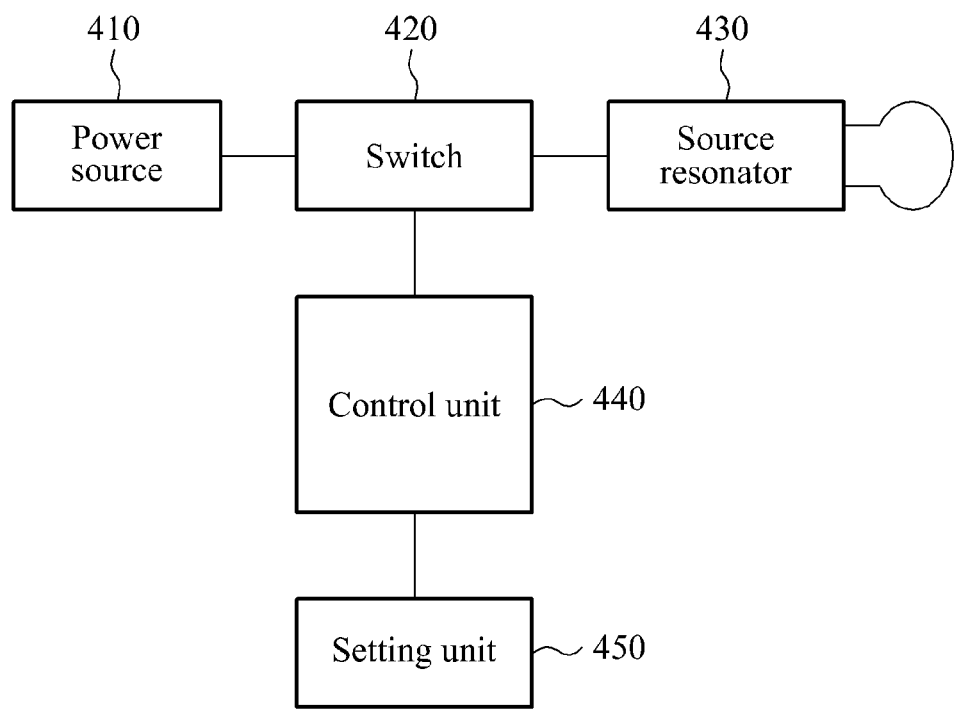
FIG. 4 is a diagram illustrating an example of a wireless power transmission apparatus.

FIG. 4 is a diagram illustrating an example of a wireless power transmission apparatus. Referring to FIG. 4, the wireless power transmission apparatus includes a switch 420, a source resonator 430, a control unit 440, and a setting unit 450. The source resonator 430 transmits power through a mutual resonance with a target resonator. The switch 420 connects the source resonator 430 to a power source 410. The power source 410 supplies power to the source resonator 430. The power source 410 may be one of a DC voltage source and a DC current source. The power source 410 supplies power to the source resonator 430 when the source resonator 430 is connected to the power source 410 through the switch 420. The switch 420 may be turned on and off under a control of the control unit 440. When the switch 420 is turned on, the source resonator 430 is connected to the power source 410. When the switch 420 is turned off, the source resonator 430 is disconnected from the power source 410.

The setting unit 450 dynamically sets a target amount of current desired to flow in the source resonator 430. The control unit 440 controls the switch 420 based on the target amount of current set by the setting unit 450. That is, the control unit 440 controls the switch 420 so that the target amount of current set by the setting unit 450 flows in the source resonator 430. The setting unit 450 may dynamically set the target amount of current based on various items of information. For example, the setting unit 450 may dynamically set the target amount of current based on data to be transmitted to the target resonator. The setting unit 450 may dynamically set the target amount of current based on an actual amount of current flowing in the source resonator 430. The setting unit 450 may dynamically set the target amount of current based on a resonance waveform of the source resonator 430. The setting unit 450 may dynamically set the target amount of current based on a combination of at least two of the aforementioned information. Operations of the control unit 440 and the setting unit 450 will be described in detail with reference to FIGS. 5A through 14B.

Figure 5A:
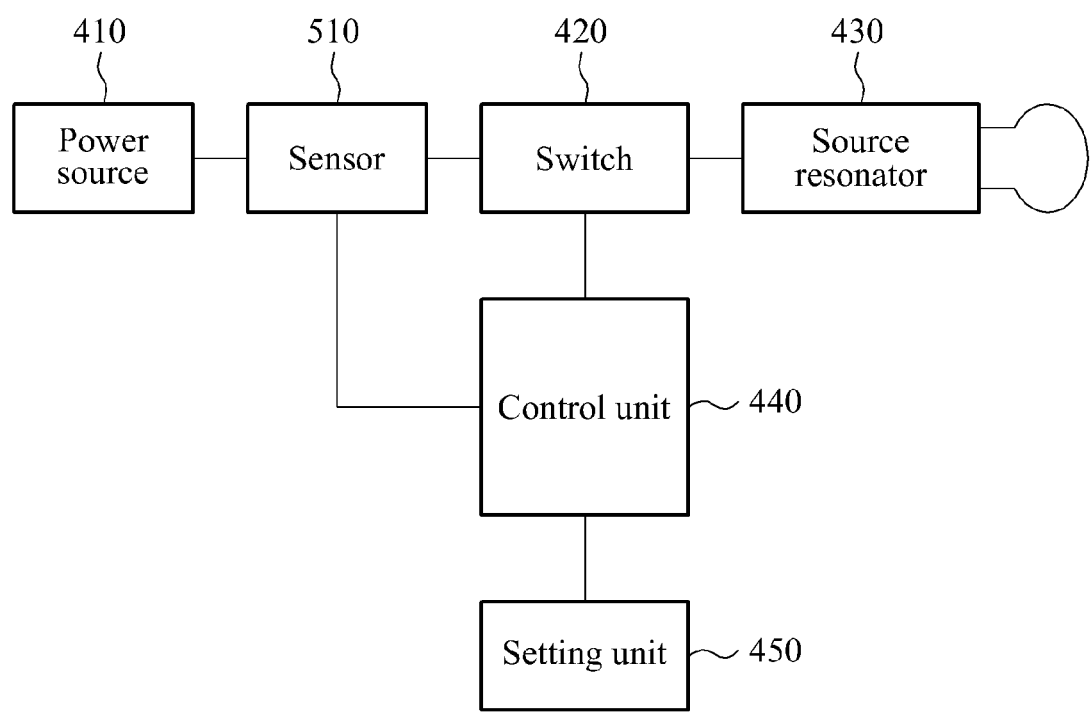
FIGS. 5A through 5E are diagrams illustrating examples of a wireless power transmission apparatus including a sensor connected in series to a source resonator.

FIGS. 5A through 5E are diagrams illustrating examples of a wireless power transmission apparatus including a sensor 510 connected in series to the source resonator 430. Referring to FIG. 5A, the sensor 510 is disposed in series between the power source 410 and the source resonator 430. The sensor 510 senses an actual amount of current flowing in the source resonator 430. The sensor 510 may be disposed in series between the switch 420 and the source resonator 430. Hereinafter, for ease of description, a case in which the sensor 510 is disposed in front of the switch 420 is used as an example, and is not to be construed as being limited thereto. The descriptions provided hereinafter may also apply to a case in which the sensor 510 is disposed behind the switch 420. The control unit 440 controls the switch 420 based on the actual amount of current flowing in the source resonator 430. For example, the control unit 440 may control the switch 420 by comparing the actual amount of current sensed by the sensor 510 to the target amount of current set by the setting unit 450.

Figure 5B:
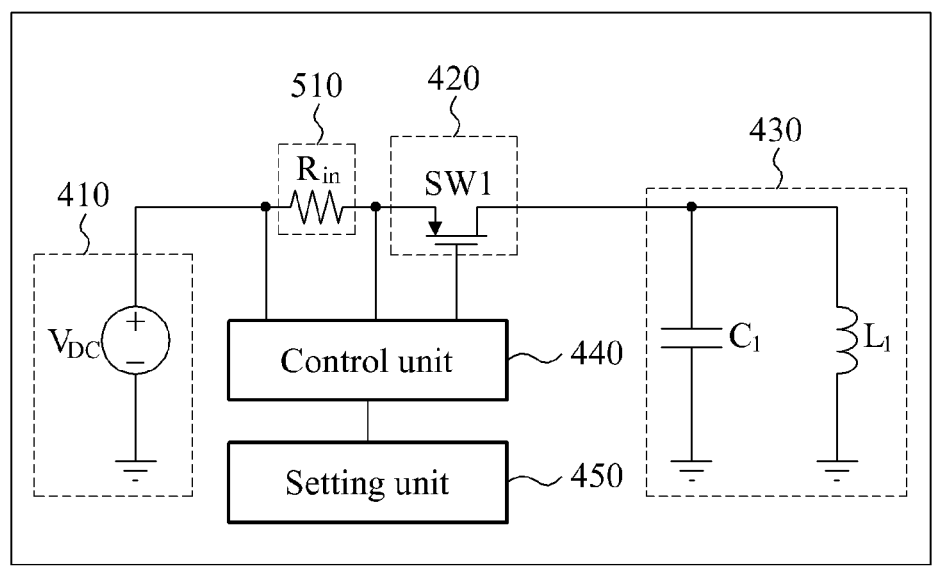

Referring to FIG. 5B, the source resonator 430 corresponds to an IC scheme. The source resonator 430 includes an inductor $L_1$ and a capacitor $C_1$. In FIG. 5B, the switch 420 includes a transistor SW1. As described with reference to FIG. 5E, the switch 420 may include a combination of a transistor and a diode. When the switch 420 is turned off, the switch 420 blocks a forward current or voltage and a backward current or voltage. The sensor 510 includes a sensing resistor $R_{in}$. The sensor 510 may sense an amount of current flowing through the sensing resistor $R_{in}$ based on a potential difference between both ends of the sensing resistor $R_{in}$. A resistance of the sensing resistor $R_{in}$ may be set to be overly low to prevent a power loss. When the resistance of the sensing resistor $R_{in}$ is set to be relatively low, an amount of power lost at the sensing resistor $R_{in}$ may decrease, whereby energy charging efficiency may increase.

When the resistance of the sensing resistor $R_{in}$ is less than a threshold value, an amount of current greater than a threshold amount of current allowed to flow in the source resonator 430 may be applied to the source resonator 430. Thus, the source resonator 430 may not perform a normal operation. The sensor 510 senses the actual amount of current flowing in the source resonator 430, and the control unit 440 turns off the switch 420 based on the target amount of current set by the setting unit 450. In an example, only an amount of current less than or equal to the target amount of current may be allowed to flow in the source resonator 430, and the wireless power transmission apparatus may increase the energy charging efficiency while operating the source resonator 430 normally.

The control unit 440 transmits an off signal to the switch 420 to turn off the switch 420. When the sensed actual amount of current is greater than or equal to the set target amount of current, the control unit 440 transmits the off signal to the switch 420 to turn off the switch 420. For example, in a case in which the transistor SW1 of the switch 420 is a P-channel metal oxide semiconductor (PMOS), the switch 420 may be turned off when a difference between a voltage applied to a source of the PMOS and a voltage applied to a gate of the PMOS is less than a threshold voltage of the PMOS. When the sensed actual amount of current is greater than or equal to the set target amount of current, the control unit 440 may apply, to the gate of the PMOS, a control signal of a voltage greater than the voltage applied to the source of the PMOS that is subtracted by the threshold voltage of the PMOS. Thus, the switch 420 disconnects the source resonator 430 from the power source 410.

The control unit 440 generates a control signal, and controls an amplitude and an interval of the control signal. The control unit 440 may control the amplitude and the interval of the control signal to be an amplitude and an interval to be used to turn on and off the transistor SW1. In an example, the control unit 440 may change a state of the control signal to a first state in response to a clock signal, and change the state of the control signal from the first state to a second state through a comparison between the sensed actual amount of current and the set target amount of current. The clock signal may have an interval, for example, 1 microsecond (μs), of the symbol duration described with reference to FIG. 3A. The control unit 440 may change the state of the control signal from the second state to the first state in response to a rising edge or a falling edge of the clock signal. The control signal in the first state may be used to turn on the transistor SW1. When the sensed actual amount of current is greater than the set target amount of current, the control unit 440 may change the state of the control signal from the first state to the second state. The control signal in the second state may be used to turn off the transistor SW1. The control unit 440 may change the state of the control signal from the second state to the first state again in response to a subsequent rising edge or a subsequent falling edge of the clock signal. The control unit 440 may repeatedly perform the foregoing process.

Figure 5C:
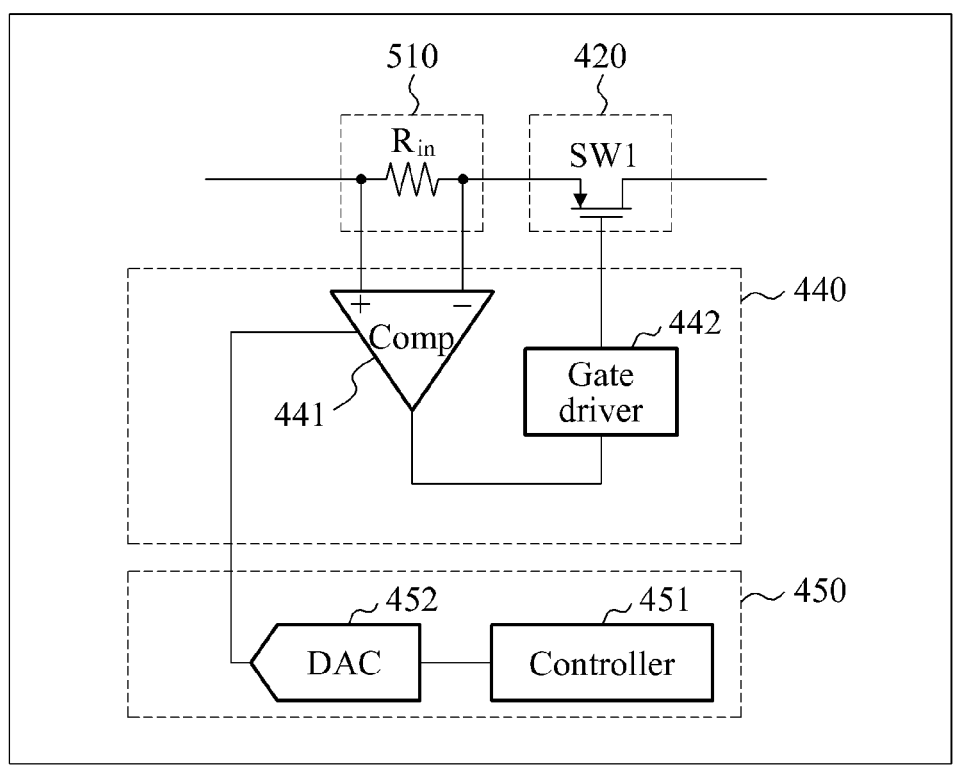

FIG. 5C illustrates an example of the control unit 440 and the setting unit 450. Referring to FIG. 5C, the control unit 440 is connected to the sensor 510 and the switch 420. The control unit 440 includes a comparator 441 connected to both of the ends of the sensing resistor $R_{in}$ included in the sensor 510 to compare a voltage applied between both of the ends of the sensing resistor $R_{in}$ (hereinafter, referred to as a "sensing voltage") to a voltage set by the setting unit 450 (hereinafter, referred to as a "set voltage"). The set voltage may correspond to a target amount of current.

The control unit 440 further includes a gate driver 442 configured to output a voltage applied to a gate of the switch 420 based on an output signal of the comparator 441. In a case in which the transistor SW1 of the switch 420 is the PMOS, the gate driver 442 may apply, to the gate of the PMOS, the control signal of the voltage greater than the voltage applied to the source of the PMOS that is subtracted by the threshold voltage of the PMOS, when the sensing voltage is greater than or equal to the set voltage as a result of the comparison performed by the comparator 441. Thus, the switch 420 may disconnect the source resonator 430 from the power source 410. The control unit 440 may be synchronized with the clock signal to output a voltage to be applied to the gate of the switch 420. At every interval of the synchronized clock signal, the control unit 440 may apply, to the gate of the PMOS, a control signal of a voltage less than or equal to the voltage applied to the source of the PMOS that is subtracted by the threshold voltage of the PMOS. Thus, the switch 420 may connect the source resonator 430 to the power source 410.

The setting unit 450 includes a controller 451 and a digital-to-analog converter (DAC) 452. The controller 451 dynamically sets the target amount of current desired to flow in the source resonator 430 based on the various items of information. The control unit 440 controls the switch 420 based on the target amount of current set by the controller 451. For example, the controller 451 may dynamically set the target amount of current based on the data to be transmitted to the target resonator, the actual amount of current flowing in the source resonator 430, and/or the resonance waveform of the source resonator 430, i.e., a waveform of a voltage applied between both ends of the inductor $L_1$. The controller 451 may be implemented using a processor configured to execute software, or a hardware accelerator (HWA) specialized in a predetermined function in terms of hardware. An operation of the controller 451 will be described in detail with reference to FIGS. 6A through 9B. The DAC 452 is a device configured to convert a digital signal into an analog signal. For example, the DAC 452 converts a digital signal output from the controller 451 into an analog signal. The converted analog signal is input into the comparator 441 of the control unit 440.

Figure 5D:
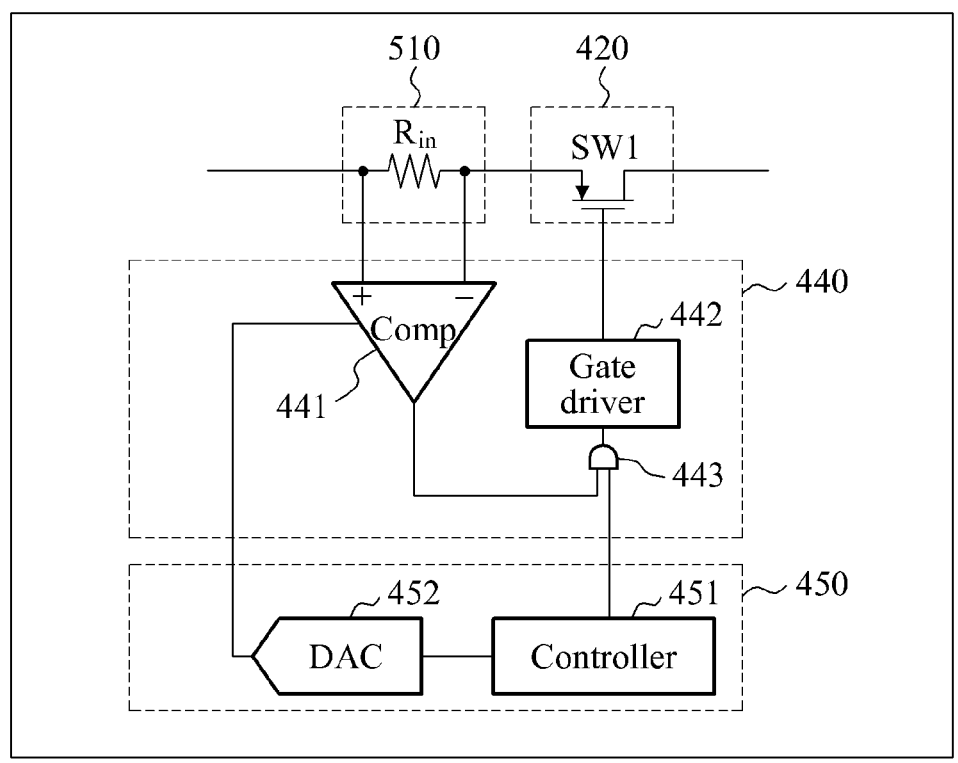

FIG. 5D illustrates another example of the control unit 440 and the setting unit 450. Referring to FIG. 5D, the control unit 440 further includes a logic gate 443. An output signal of the comparator 441 is applied as a first input of the logic gate 443. An output signal of the controller 451 of the setting unit 450 is applied as a second input of the logic gate 443. The controller 451 sets an ON duration and an OFF duration of the switch 420 based on the output signal applied as the second input of the logic gate 443. For example, the logic gate 443 may be an AND gate. The controller 451 may apply an output signal indicating a logical value of "1" as a second input of the AND gate, thereby controlling the switch 420 to operate in the ON duration. In the ON duration, the gate driver 442 may turn on and off the switch 420 based on the output signal of the comparator 441. The controller 451 may apply an output signal indicating a logical value of "0" as the second input of the AND gate, thereby controlling the switch 420 to operate in the OFF duration. In the OFF duration, the gate driver 442 may turn off the switch 420, irrespective of the output signal of the comparator 441.

Figure 5E:
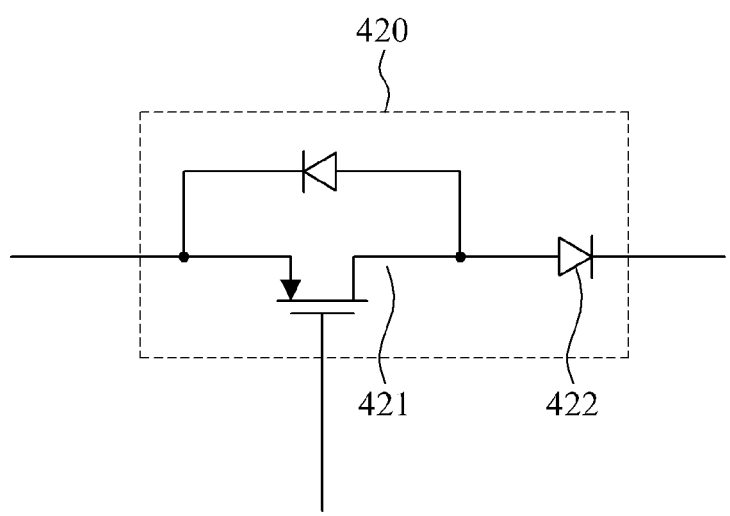

FIG. 5E illustrates an example of the switch 420. Referring to FIG. 5E, the switch 420 includes a transistor 421 disposed between the power source 410 and the source resonator 430, and a diode 422 connected in series to the transistor 421. The diode 422 may be disposed in front of or behind the transistor 421. The transistor 421 may be one of a complementary metal oxide semiconductor (CMOS), an N-channel metal oxide semiconductor (NMOS), and a PMOS. When the switch 420 is turned off, the source resonator 430 may resonate with a positive amplitude and a negative amplitude. The diode 422 may prevent current corresponding to the negative amplitude from flowing backward to an opposite side of the switch 420, or may prevent a voltage corresponding to the negative amplitude from being applied to the opposite side of the switch 420.

The transistor 421 may connect the source resonator 430 to the power source 410, and disconnect the source resonator 430 from the power source 410, based on the control signal transmitted by the control unit 440. Depending on a type of the transistor 421, the transistor 421 may connect the source resonator 430 to the power source 410 in a case in which a value of the control signal is less than a reference value, or in a case in which the value of the control signal is greater than or equal to the reference value. In addition, depending on the type of the transistor 421, the transistor may disconnect the source resonator 430 from the power source 410 in a case in which the value of the control signal is greater than or equal to the reference value, or in a case in which the value of the control signal is less than the reference value. The diode 422 is connected in series to the transistor 421. When the switch 420 is turned on, the transistor 421 and the diode 422 allows a DC signal of the power source 410 to pass through. When the switch 420 is turned off, the transistor 421 and the diode 422 blocks an inflow of an AC signal from the source resonator 430.

Figure 6A:
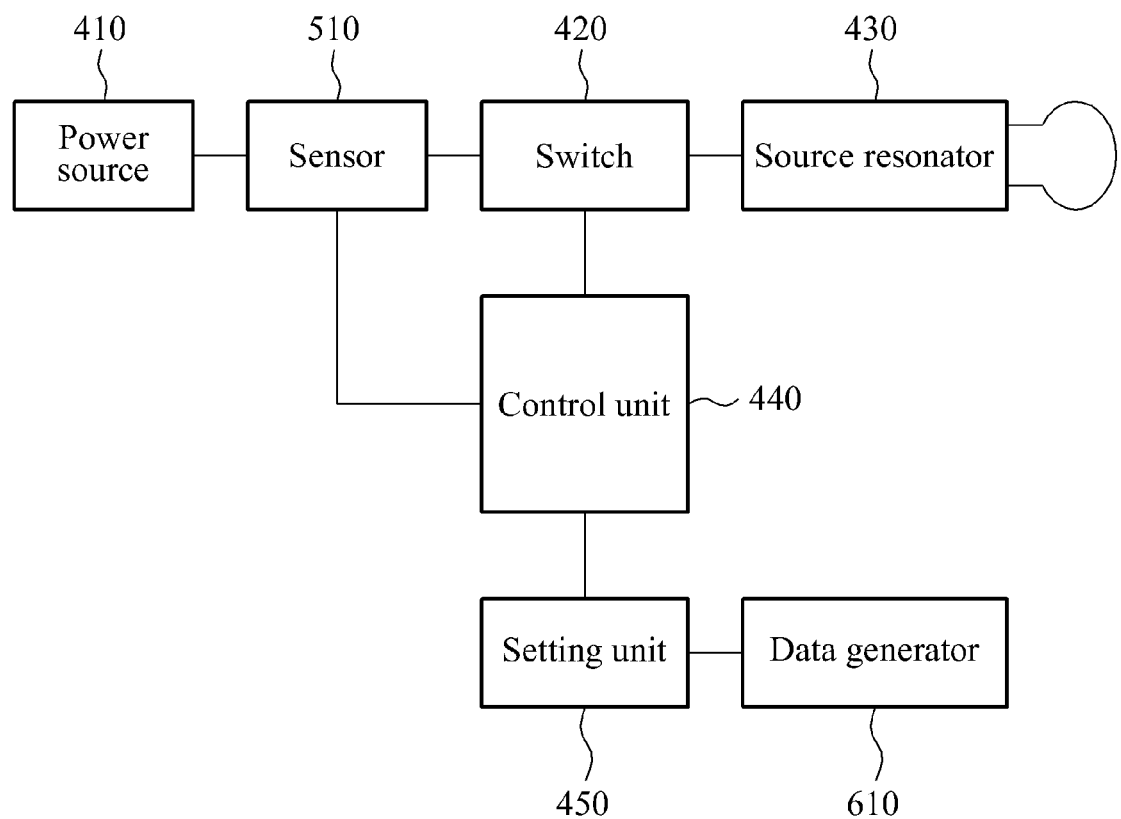
FIGS. 6A through 9B are diagrams illustrating examples of modifying an input of a setting unit in an example in which a sensor is connected in series to a source resonator.

FIGS. 6A through 9B are diagrams illustrating examples of modifying an input of the setting unit 450 in an example in which the sensor 510 is connected in series to the source resonator 430. Referring to FIG. 6A, the wireless power transmission apparatus further includes a data generator 610. The data generator 610 generates and outputs data to be transmitted to a target resonator. The setting unit 450 dynamically sets a target amount of current based on an output signal of the data generator 610. For example, the wireless power transmission apparatus may transmit data, using an ON-OFF keying scheme. The setting unit 450 may set the target amount of current to "0" in a case in which the output signal of the data generator 610 indicates a logical value of "0". The setting unit 450 may set the target amount of current to be a value greater than "0" in a case in which the output signal of the data generator 610 indicates a logical value of "1". A receiving end may decode received data based on a presence and an absence of received energy.

The wireless power transmission apparatus may transmit data of at least two bits. The setting unit 450 may select a candidate target amount of current corresponding to the data from a plurality of predetermined candidate target amounts of current. In a case in which the output signal of the data generator 610 indicates "00", the setting unit 450 may select a first candidate target amount of current corresponding to "00" as the target amount of current. In a case in which the output signal of the data generator 610 indicates "01", the setting unit 450 may select a second candidate target amount of current corresponding to "01" as the target amount of current. In a case in which the output signal of the data generator 610 indicates "10", the setting unit 450 may select a third candidate target amount of current corresponding to "10" as the target amount of current. In a case in which the output signal of the data generator 610 indicates "11", the setting unit 450 may select a fourth candidate target amount of current corresponding to "11" as the target amount of current.

The setting unit 450 may dynamically set the target amount of current based on a charging and discharging cycle of the source resonator 430. Referring to the graph 310 of FIG. 3A, a symbol duration may be defined as including a single charging interval and a single discharging interval. The setting unit 450 may transmit sequential items of data based on the symbol duration. For example, the setting unit 450 may set a target amount of current corresponding to first data in a first symbol duration, and set a target amount of current corresponding to second data in a second symbol duration. The receiving end may decode the first data in the first symbol duration, and decode the second data in the second symbol duration.

Figure 6B:
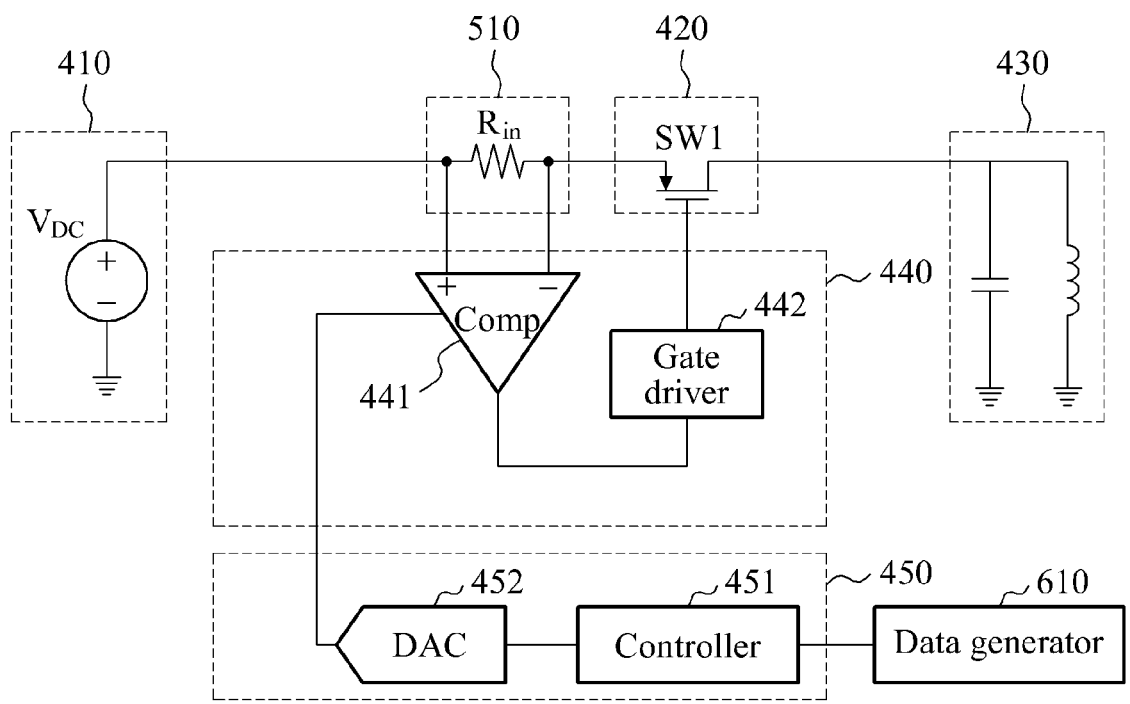

Referring to FIG. 6B, the data generator 610 is connected to the controller 451 of the setting unit 450. The data generator 610 may be a memory configured to store data to be transmitted to a target resonator. The controller 451 obtains data from the data generator 610, and dynamically sets a target amount of current based on the obtained data.

Figure 7A:
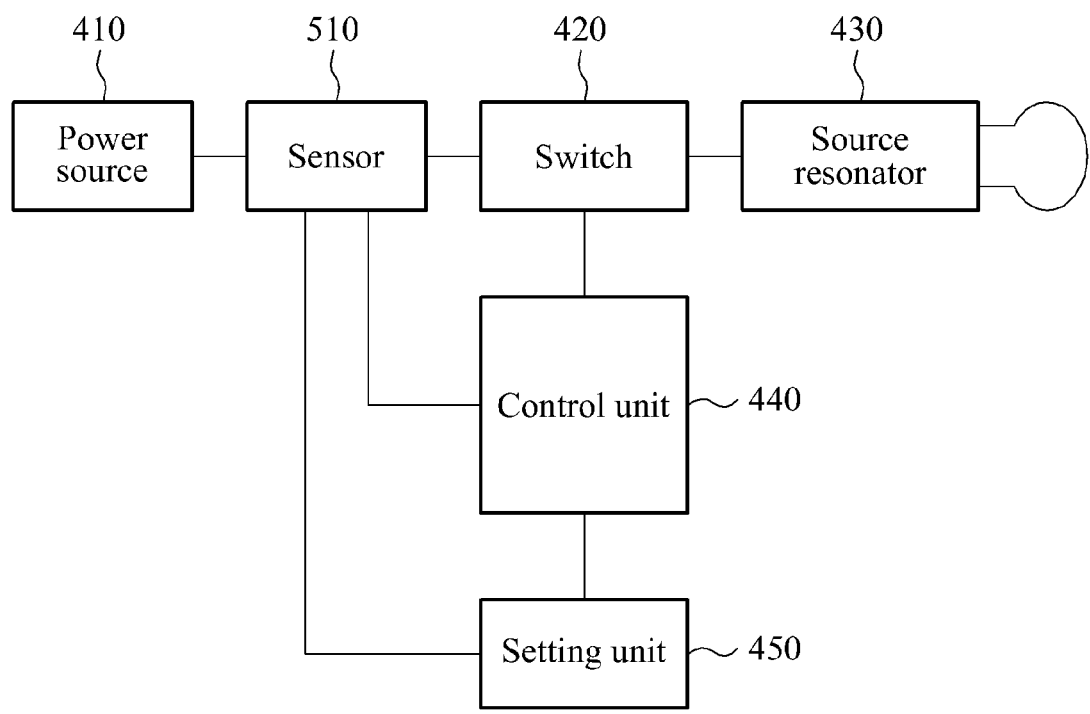

Referring to FIG. 7A, the setting unit 450 is connected to the sensor 510. The setting unit 450 dynamically sets a target amount of current based on an actual amount of current flowing in the source resonator 430. Referring to FIG. 3C, an energy waveform of the source resonator 430 may be changed due to a target resonator coupled to the source resonator 430. When energy injection is performed periodically based on a symbol unit, a pattern of the energy injection may be changed based on an amount of residual energy of the source resonator 430. The setting unit 450 monitors the actual amount of current flowing in the source resonator 430 based on an output signal of the sensor 510. The setting unit 450 sets the target amount of current based on the actual amount of current, and may adjust a preset target amount of current. For example, the setting unit 450 may analyze whether a target resonator coupled to the source resonator 430 is present based on information of an amount of inflow current in a case in which a target resonator coupled to the source resonator 430 is present at a relatively short distance from the source resonator 430, and information of an amount of inflow current in a case in which a target resonator coupled to the source resonator 430 is present at a relatively long distance from the source resonator 430. The setting unit 450 may analyze a power reception state of the target resonator, and a coupling state between the source resonator 430 and the target resonator, based on information of an amount of inflow current that may change based on the power reception state or the coupling state. The setting unit 450 may analyze an amount of residual energy of the source resonator 430 based on information of an amount of inflow current that may be affected by the amount of residual energy of the source resonator 430. The setting unit 450 may set the target amount of current, and adjust the preset target amount of current, based on the analyzed information.

Figure 7B:
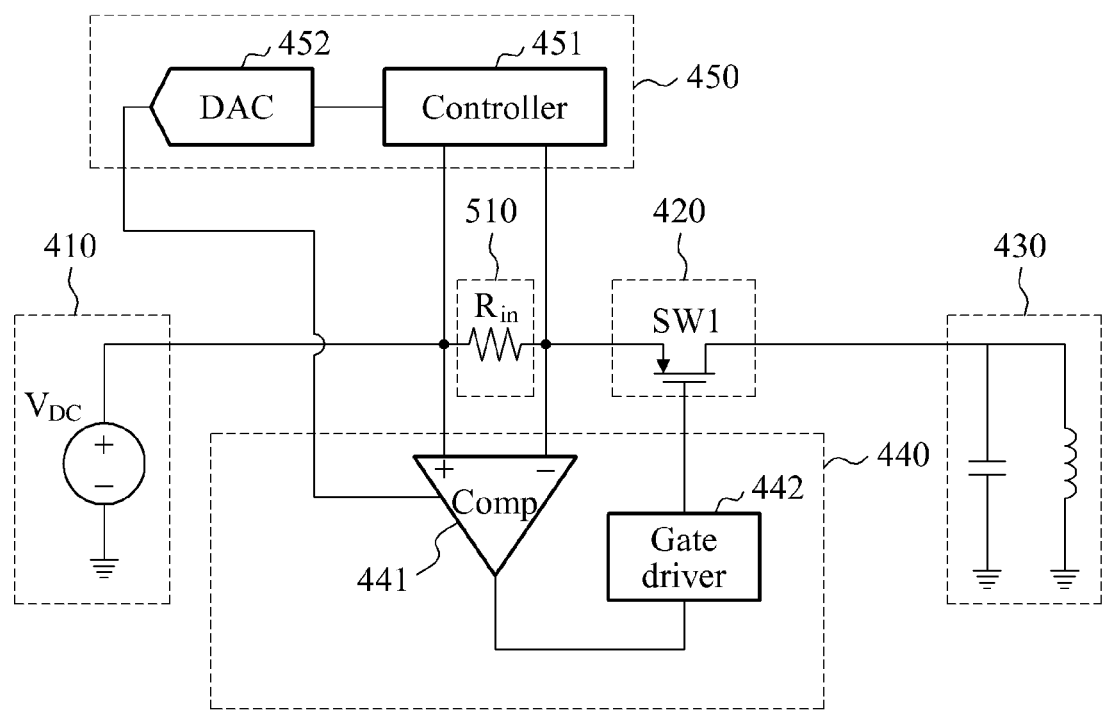

Referring to FIG. 7B, a voltage applied between both ends of the sensing resistor $R_{in}$ of the sensor 510 is input into the controller 451 of the setting unit 450. Although not shown in FIG. 7B, the voltage applied between both ends of the sensing resistor $R_{in}$ may be input into the controller 451 through an analog-to-digital converter (ADC). The controller 451 analyzes an actual amount of current flowing in the source resonator 430 based on the voltage difference between both of the ends of the sensing resistor $R_{in}$, and dynamically sets a target amount of current based on the analyzed actual amount of current flowing in the source resonator 430.

Figure 8A:
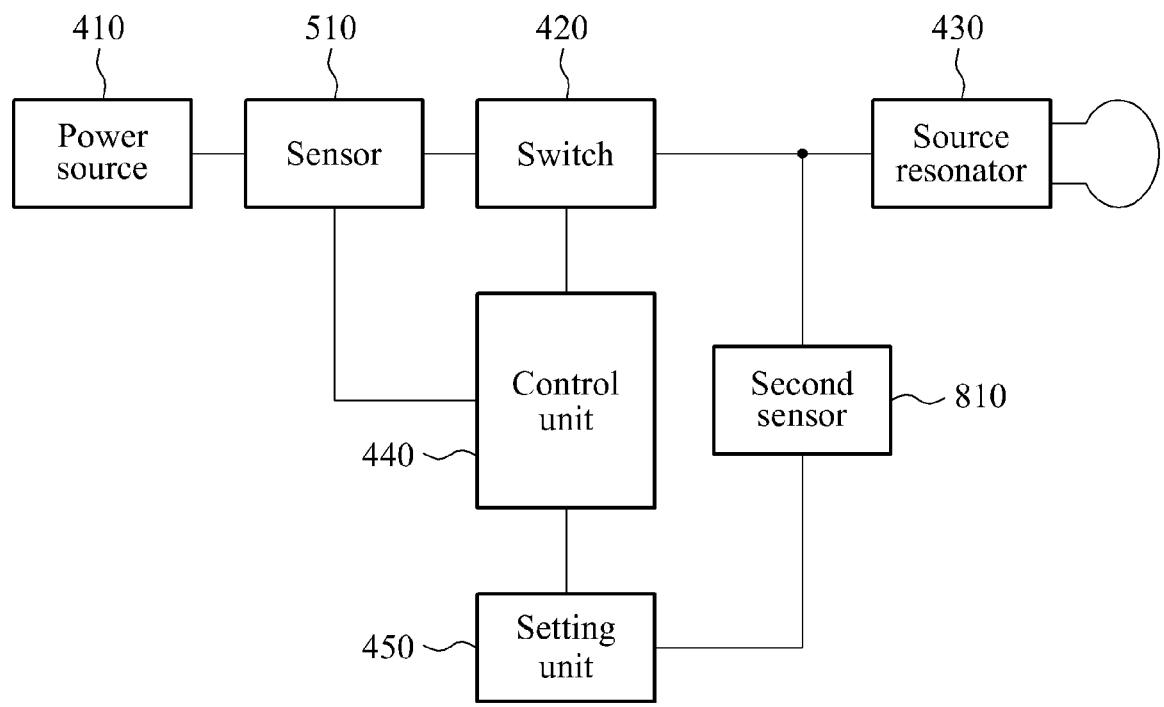

Referring to FIG. 8A, the wireless power transmission apparatus further includes a second sensor 810. The second sensor 810 senses a resonance waveform of the source resonator 430. For example, the second sensor 810 may sense a voltage $V_{tx}$ of the source resonator 430 (e.g., a waveform of a voltage applied between both ends of an inductor) that may change over time. The setting unit 450 dynamically sets a target amount of current based on the resonance waveform of the source resonator 430 sensed by the second sensor 810.

The setting unit 450 may analyze a feedback transmitted from the target resonator based on the resonance waveform of the source resonator 430. The resonance waveform of the source resonator 430 may include feedback information transmitted from the target resonator. For example, an amount of energy needed by a receiving end may be changed based on an application of the receiving end of the wireless power transmission apparatus. The receiving end may request an increase or a decrease in an amount of energy to be transmitted. Since an amount of received energy may be changed based on a distance between the source resonator 430 and the target resonator, the receiving end may transmit feedback information of the received energy. The setting unit 450 may dynamically control the amount of energy to be transmitted by dynamically setting the target amount of current based on the feedback information.

Figure 8B:
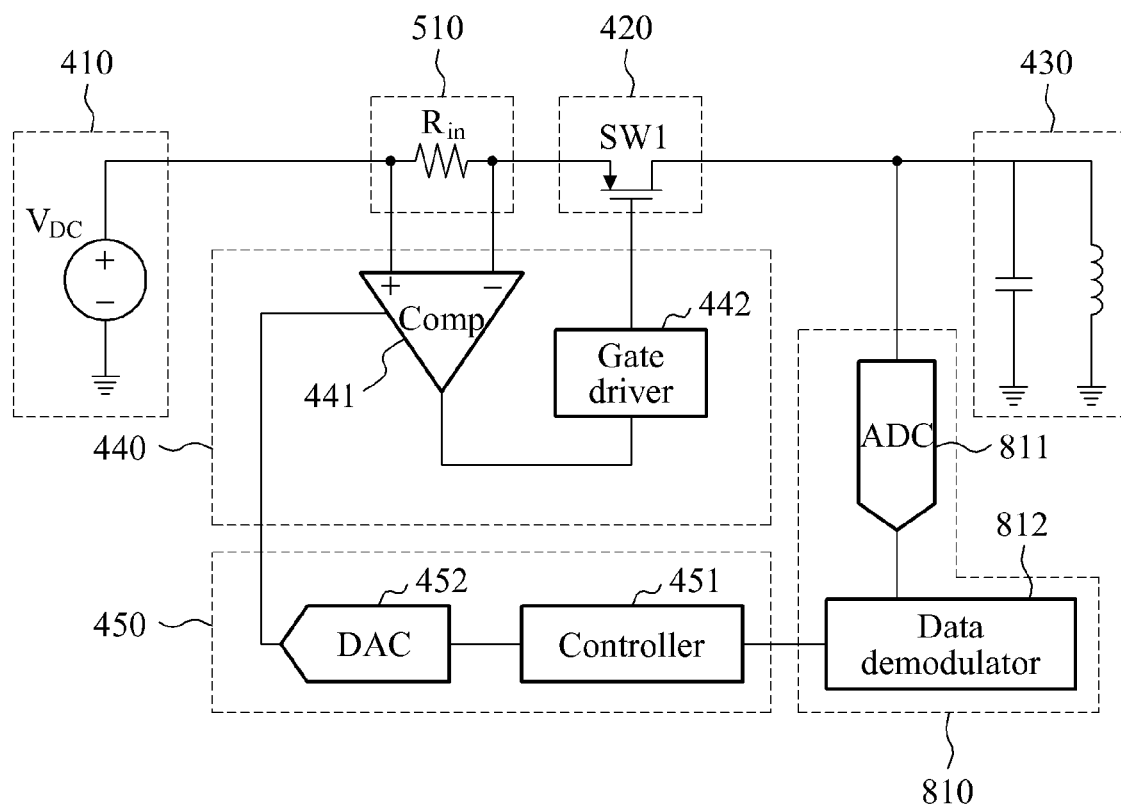

Referring to FIG. 8B, the second sensor 810 includes an ADC 811 and a data demodulator 812. The ADC 811 converts a voltage of the source resonator 430, which is an analog signal, into a digital signal. The data demodulator 812 demodulates data, using the digital signal. In an example, the data demodulator 812 may be implemented to be included in the controller 451 of the setting unit 450. The data demodulator 812 transfers the demodulated data to the controller 451, and the controller 451 dynamically sets a target amount of current based on the demodulated data.

Figure 9A:
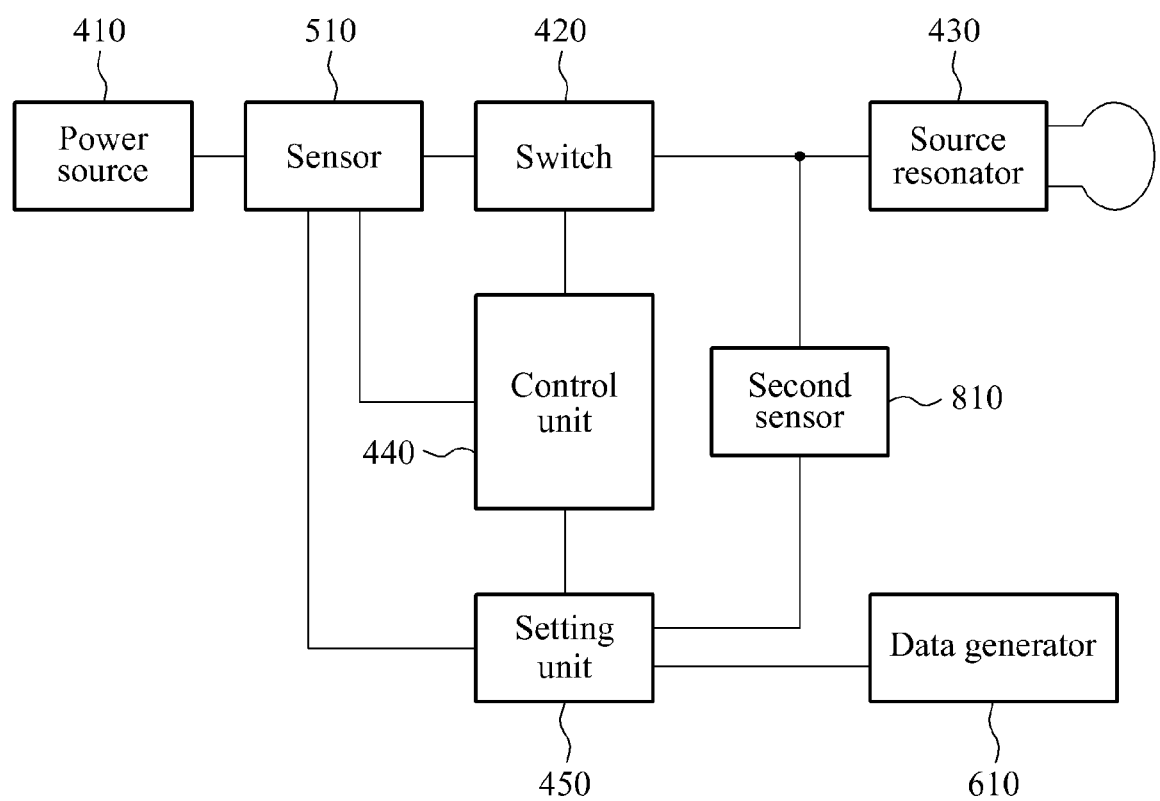

Referring to FIG. 9A, the setting unit 450 is connected to the sensor 510, the data generator 610, and the second sensor 810. The setting unit 450 may dynamically set a target amount of current based on various combinations of input information. The setting unit 450 may determine whether a receiving end is present based on information sensed by the sensor 510. When it is determined that a receiving end is absent, the setting unit 450 may operate in an idle mode to reduce power consumption. In the idle mode, the setting unit 450 may not perform energy charging. The setting unit 450 may determine whether a transition from the idle mode to an operation mode is to be performed after a predetermined period of time elapses. The setting unit 450 may perform energy charging after the predetermined period of time elapses, and determine whether a coupled receiving end is present based on the information sensed by the sensor 510. When it is determined that a receiving end is present, the setting unit 450 may set the target amount of current based on data generated by the data generator 610. The setting unit 450 may receive a signal fed back from the receiving end through the second sensor 810. As an example, the receiving end may transmit a feedback signal to inform the setting unit 450 of a successful reception of data, using a target resonator. The setting unit 450 may set a target amount of current so that subsequent data may be transmitted after the feedback signal is received. The foregoing operation is provided as an example, and the operation of the setting unit 450 may be variously extended or modified.

Figure 9B:
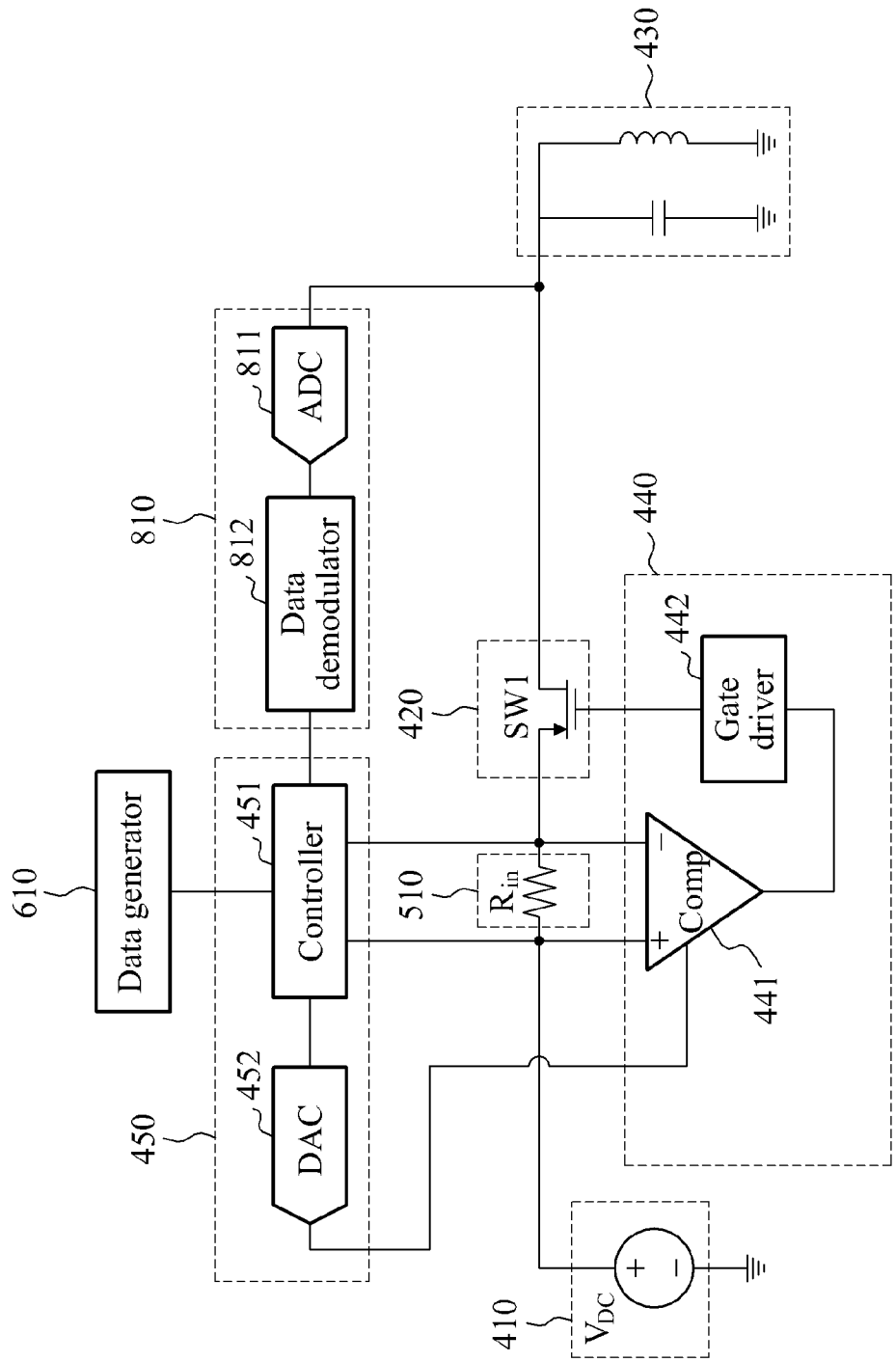

Referring to FIG. 9B, the controller 451 of the setting unit 450 may receive various items of input information from the sensor 510, the data generator 610, and the second sensor 810. The descriptions provided with reference to FIGS. 1 through 9A may apply to each module illustrated in FIG. 9B and thus, duplicated descriptions will be omitted for conciseness.

Figure 10A:
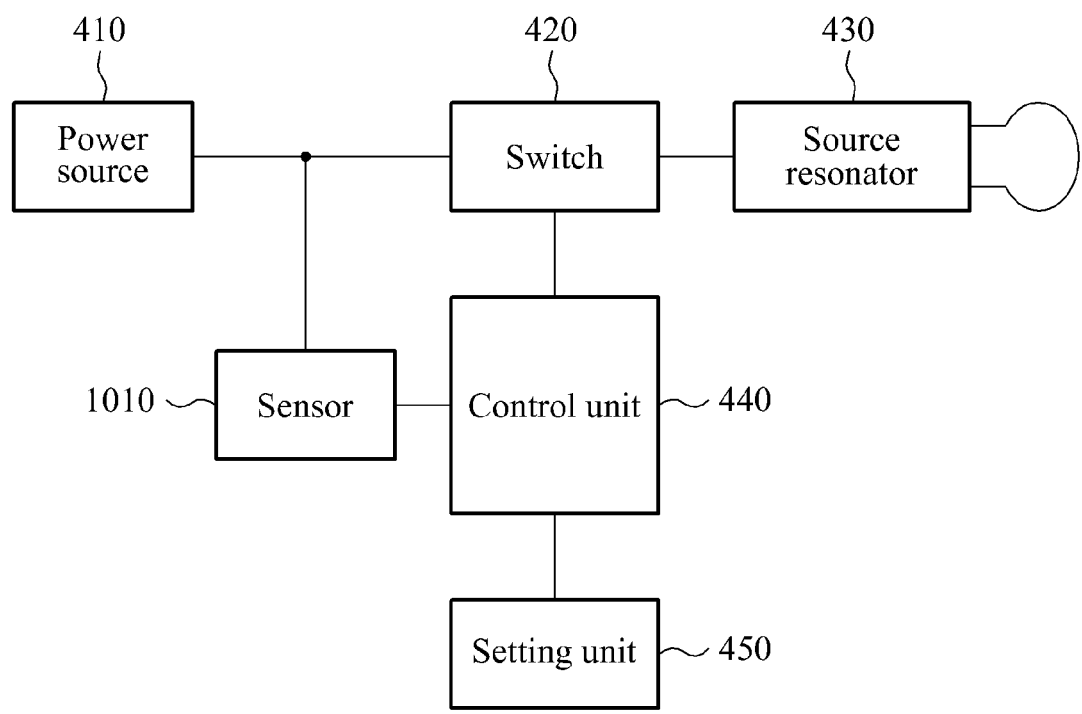
FIGS. 10A through 10E are diagrams illustrating examples of a wireless power transmission apparatus including a sensor connected in parallel to a source resonator.

FIGS. 10A through 10E are diagrams illustrating examples of the wireless power transmission apparatus including a sensor 1010 connected in parallel to the source resonator 430. Referring to FIG. 10A, the sensor 1010 is disposed in parallel between the power source 410 and the source resonator 430. The sensor 1010 senses an actual amount of current flowing in the source resonator 430. For example, the sensor 1010 may sense current mirrored from current flowing through the switch 420. An amount of the mirrored current may correspond to 1/N of the actual amount of current, for example, N=400. The sensor 1010 may sense the actual amount of current with lower power consumption in comparison to the sensor 510 of FIG. 5A. The control unit 440 controls the switch 420 based on the actual amount of current flowing in the source resonator 430. For example, the control unit 440 may control the switch 420 by comparing the actual amount of current sensed by the sensor 1010 to a target amount of current set by the setting unit 450.

Figure 10B:
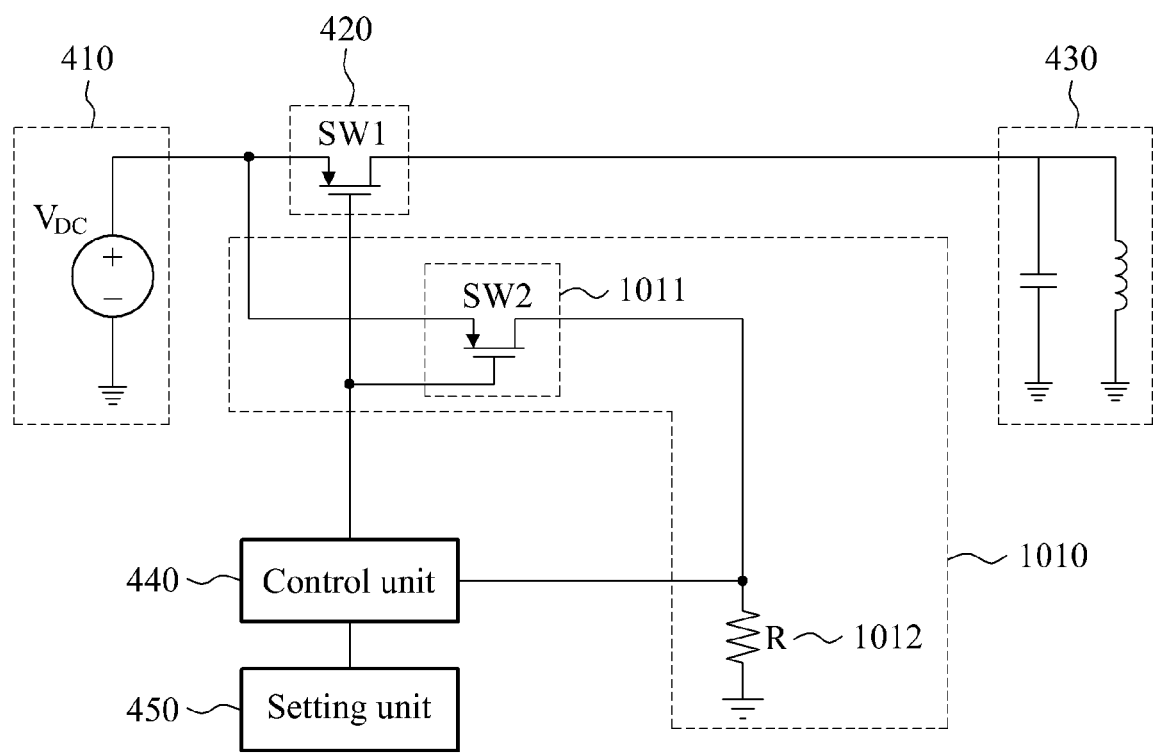

Referring to FIG. 10B, the sensor 1010 includes a sensing transistor SW2 1011 and a sensing resistor R 1012. The sensing transistor SW2 1011 may have a smaller size than the transistor SW1 of the switch 420. The same gate signal is applied to a gate of the sensing transistor SW2 1011 and a gate of the transistor SW1. The same input voltage is applied to a source of the sensing transistor SW2 1011 and a source of the transistor SW1. Current flowing in the sensing transistor SW2 1011 corresponds to current mirrored from the current flowing in the transistor SW1. For example, an amount of current flowing in the sensing transistor SW2 1011 may correspond to 1/N times an amount of the current flowing in the transistor SW1. The sensor 1010 outputs a difference in voltage applied between both ends of the sensing resistor R 1012, the difference in voltage indicating an actual amount of current flowing through the sensing transistor SW2 1011. In a case in which one end of the sensing resistor R 1012 is connected to ground (GND), the sensor 1010 may output a voltage at the other end of the sensing resistor R 1012. The control unit 440 obtains the actual amount of current based on an output signal of the sensor 1010, and controls the switch 420 by comparing the actual amount of current to a target amount of current set by the setting unit 450.

Figure 10C:
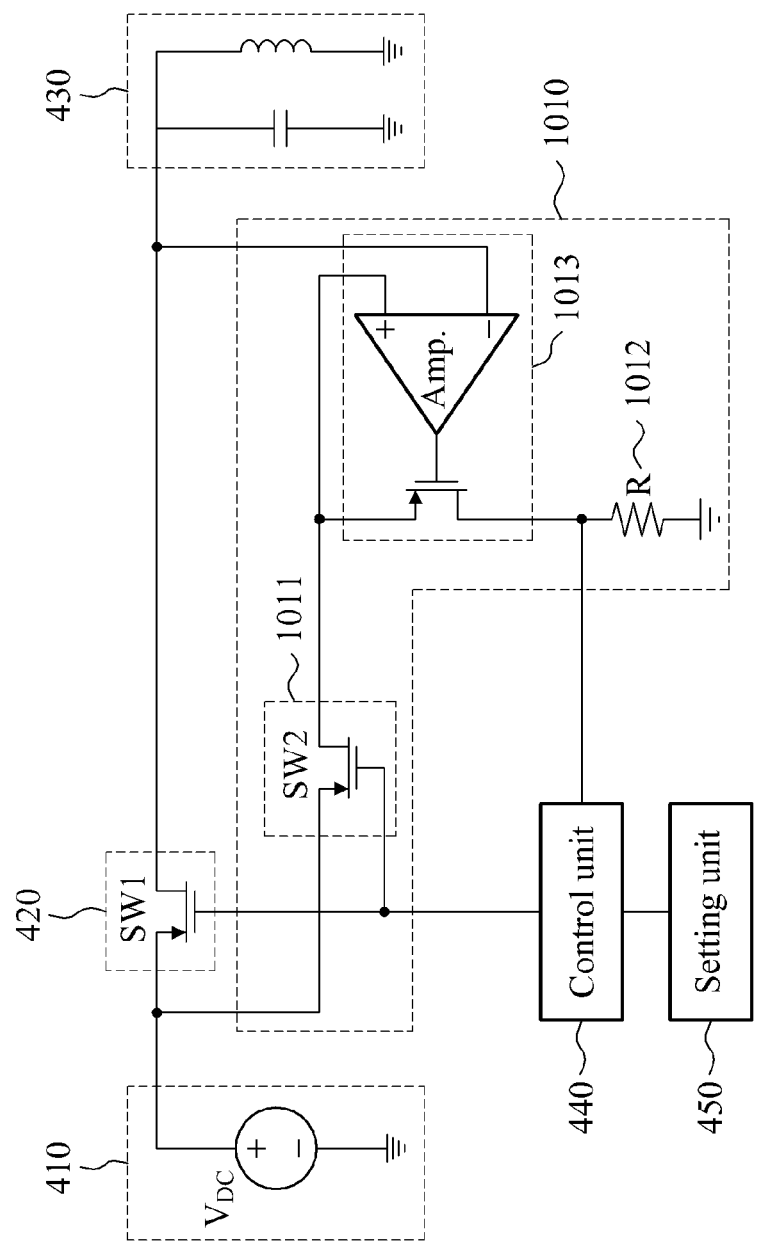

Referring to FIG. 10C, the sensor 1010 further includes a voltage corrector 1013. The voltage corrector 1013 includes a differential amplifier and a transistor. The voltage corrector 1013 substantially equalizes a voltage applied from a drain of the transistor SW1 of the switch 420 to a negative (−) input end of the differential amplifier (hereinafter, referred to as a "first input voltage"), and a voltage applied from a drain of the sensing transistor SW2 1011 to a positive (+) input end of the differential amplifier (hereinafter, referred to as a "second input voltage"). When the second input voltage is lower than the first input voltage, the voltage corrector 1013 pulls up the second input voltage. When the second input voltage is higher than the first input voltage, the voltage corrector 1013 pulls down the second input voltage. The sensor 1010 may more precisely sense the actual amount of current.

Figure 10D:
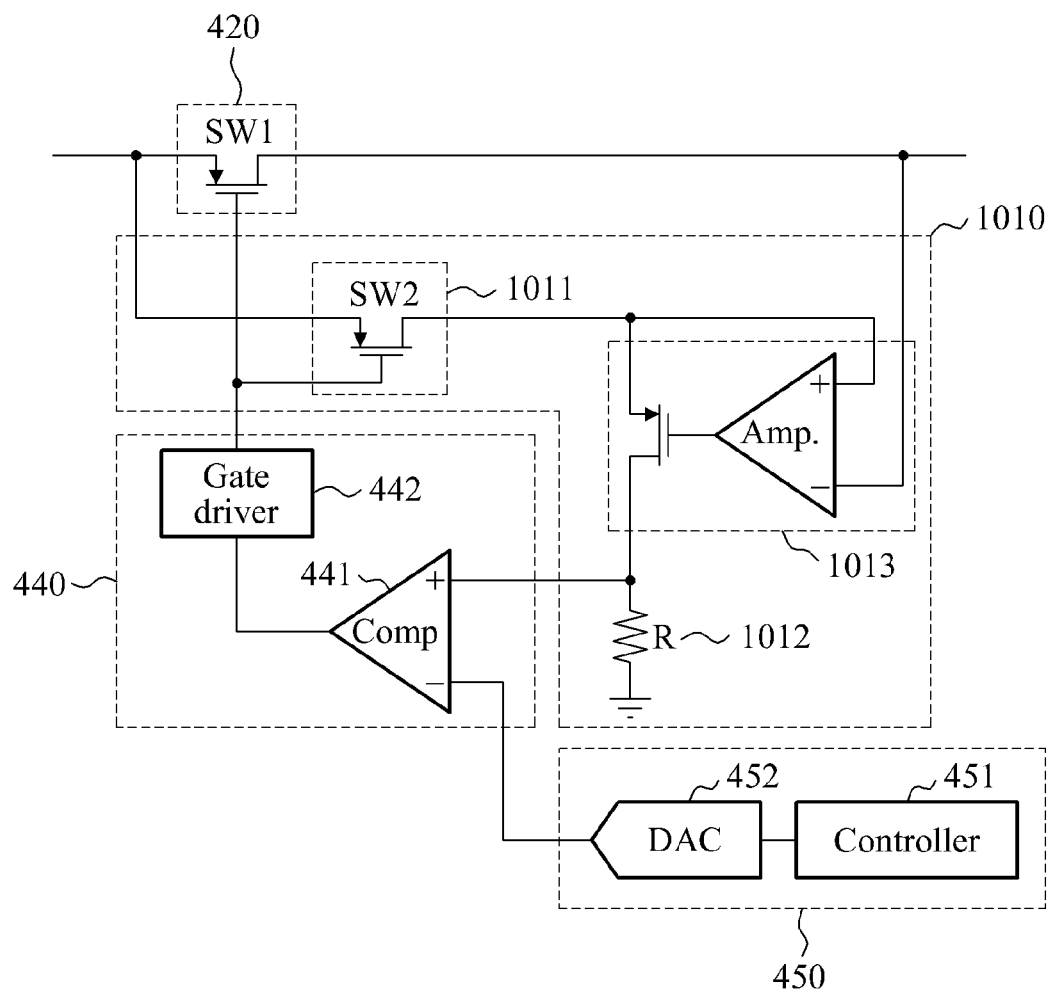

Referring to FIG. 10D, the control unit 440 includes the comparator 441 and the gate driver 442. The setting unit 450 includes the controller 451 and the DAC 452. The comparator 441 compares an output signal of the sensor 1010 to an output signal of the setting unit 450. The gate driver 442 controls the transistor SW1 of the switch 420 and the sensing transistor SW2 1011 based on an output signal of the comparator 441.

Figure 10E:
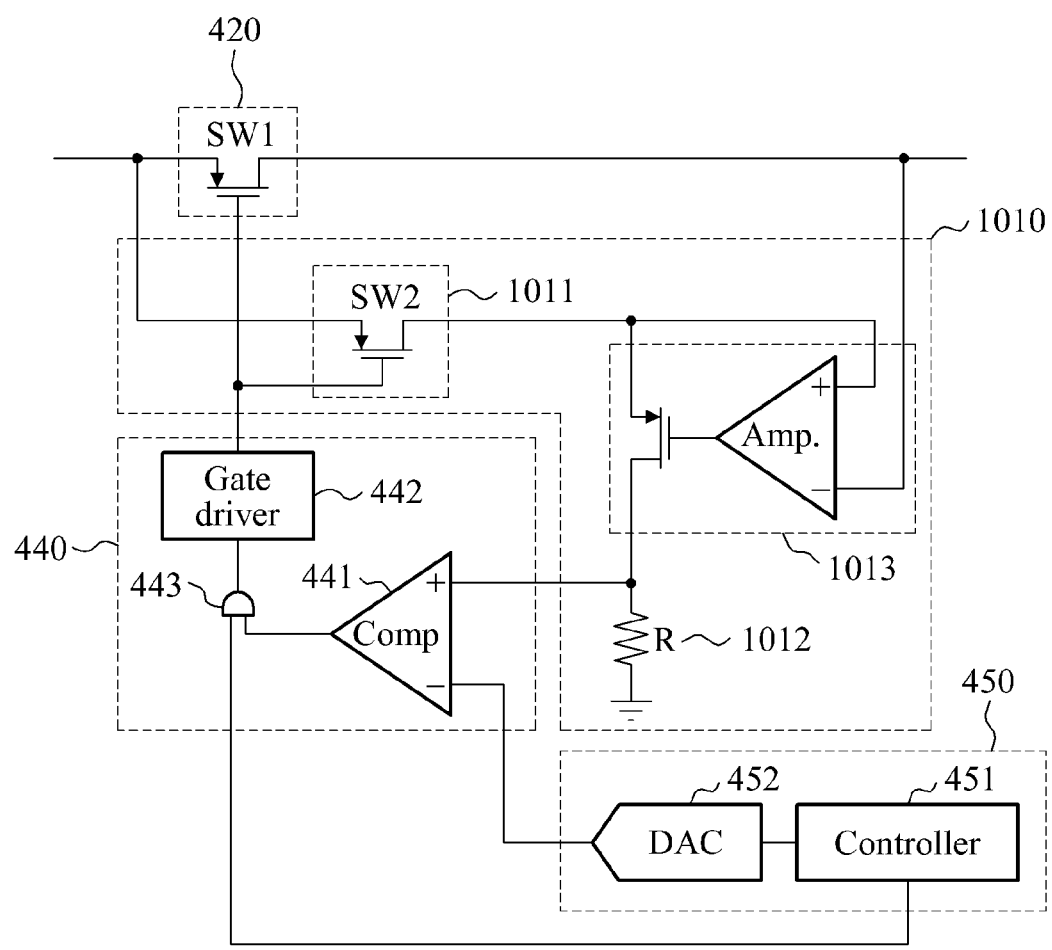

Referring to FIG. 10E, the control unit 440 further includes the logic gate 443. An output signal of the comparator 441 is applied as a first input of the logic gate 443. An output signal of the controller 451 is applied as a second input of the logic gate 443. The controller 451 may set an ON duration and an OFF duration of the switch 420 based on the output signal applied as the second input of the logic gate 443.

Figure 11A:
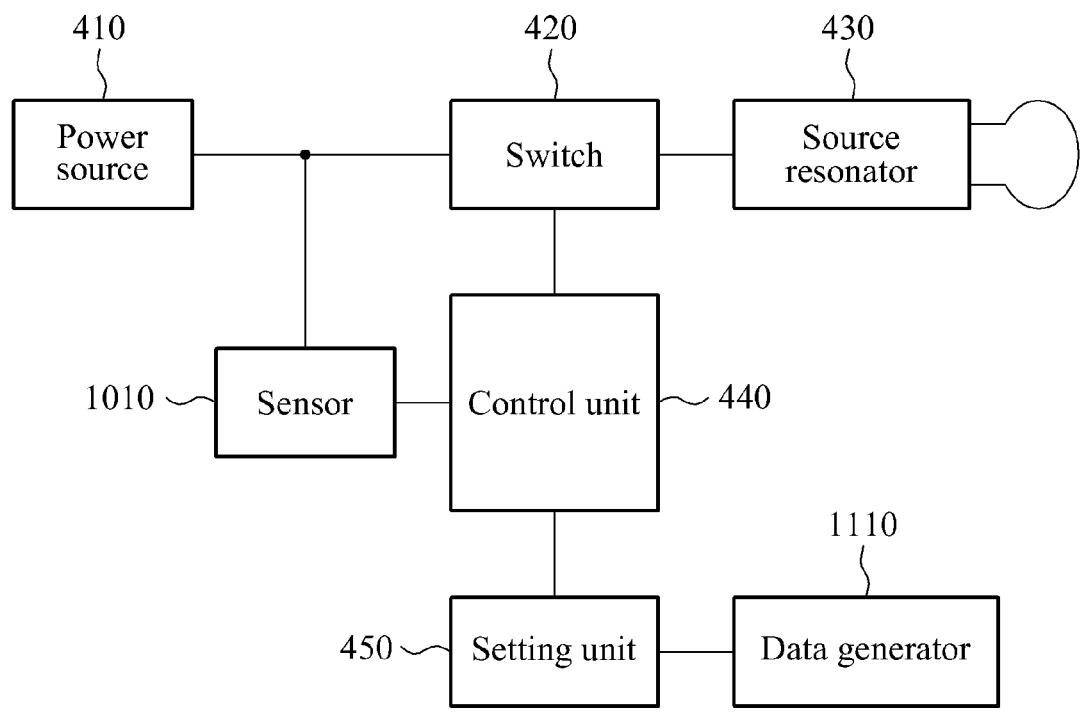
FIGS. 11A through 14B are diagrams illustrating examples of modifying an input of a setting unit in an example in which a sensor is connected in parallel to a source resonator.

FIGS. 11A through 14B are diagrams illustrating examples of modifying an input of the setting unit 450 in an example in which the sensor 1010 is connected in parallel to the source resonator 430. Referring to FIG. 11A, the wireless power transmission apparatus further includes a data generator 1110. The data generator 1110 outputs data to be transmitted to a target resonator. The setting unit 450 dynamically sets a target amount of current based on an output signal of the data generator 1110. For example, the wireless power transmission apparatus may transmit data, using an ON-OFF keying scheme. The setting unit 450 may set the target amount of current to "0" in a case in which the output signal of the data generator 1110 indicates a logical value of "0". The setting unit 450 may set the target amount of current to be a value greater than "0" in a case in which the output signal of the data generator 1110 indicates a logical value of "1". A receiving end may decode received data based on a presence and an absence of received energy.

The wireless power transmission apparatus may transmit data of at least two bits. The setting unit 450 may select a candidate target amount of current corresponding to the data from a plurality of predetermined candidate target amounts of current. In a case in which the output signal of the data generator 1110 indicates "00", the setting unit 450 may select a first candidate target amount of current corresponding to "00" as the target amount of current. In a case in which the output signal of the data generator 1110 indicates "01", the setting unit 450 may select a second candidate target amount of current corresponding to "01" as the target amount of current. In a case in which the output signal of the data generator 1110 indicates "10", the setting unit 450 may select a third candidate target amount of current corresponding to "10" as the target amount of current. In a case in which the output signal of the data generator 1110 indicates "11", the setting unit 450 may select a fourth candidate target amount of current corresponding to "11" as the target amount of current.

The setting unit 450 may dynamically set the target amount of current based on a charging and discharging cycle of the source resonator 430. Referring to the graph 310 of FIG. 3A, a symbol duration may be defined as including a single charging interval and a single discharging interval. The setting unit 450 may transmit sequential items of data based on the symbol duration. For example, the setting unit 450 may set a target amount of current corresponding to first data in a first symbol duration, and set a target amount of current corresponding to second data in a second symbol duration. The receiving end may decode the first data in the first symbol duration, and decode the second data in the second symbol duration.

Figure 11B:
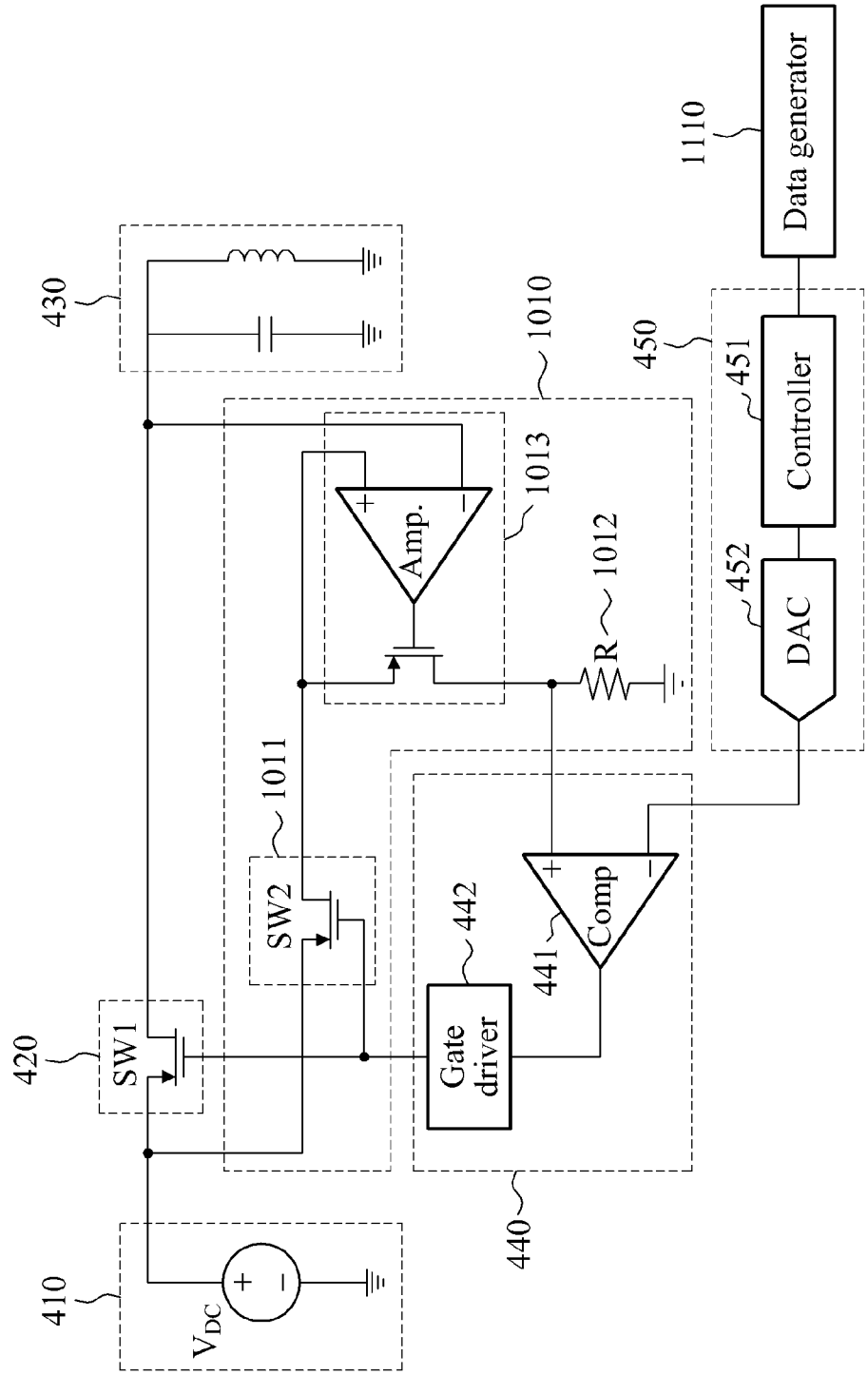

Referring to FIG. 11B, the data generator 1110 is connected to the controller 451 of the setting unit 450. The data generator 1110 may be a memory configured to store data to be transmitted to a target resonator. The controller 451 obtains data from the data generator 1110, and dynamically sets a target amount of current.

Figure 12A:
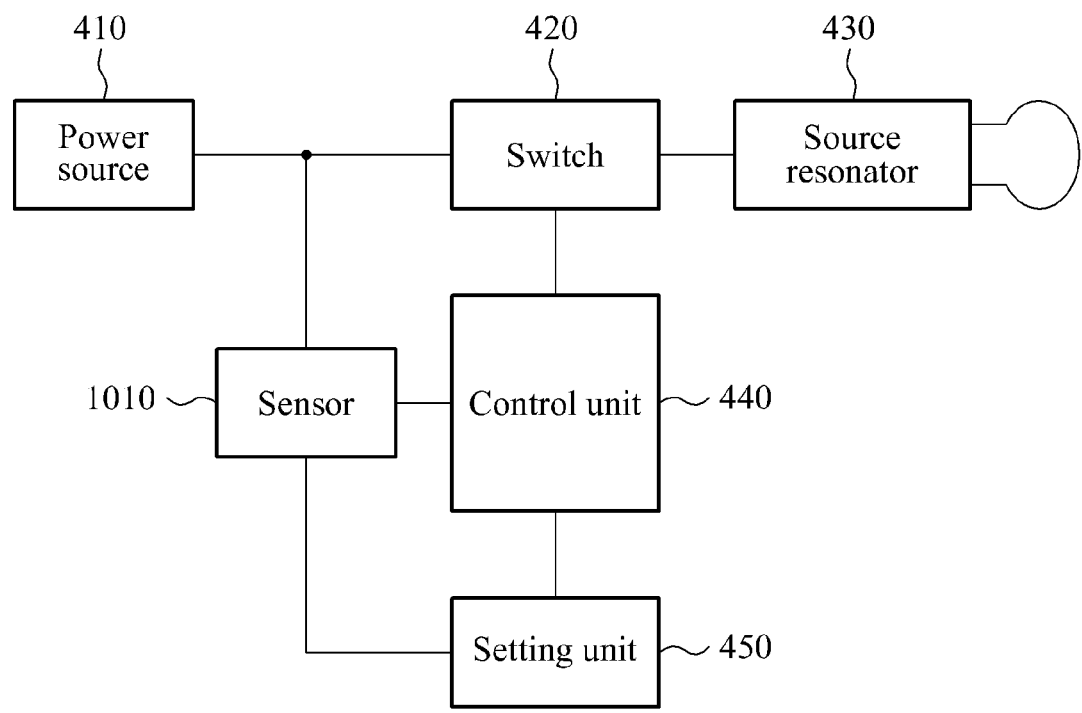

Referring to FIG. 12A, the setting unit 450 is connected to the sensor 1010. The setting unit 450 dynamically sets a target amount of current based on an actual amount of current flowing in the source resonator 430. Referring to FIG. 3C, an energy waveform of the source resonator 430 may be changed due to a target resonator coupled to the source resonator 430. When energy injection is performed periodically based on a symbol unit, a pattern of the energy injection may be changed based on an amount of residual energy of the source resonator 430. The setting unit 450 monitors the actual amount of current flowing in the source resonator 430 based on an output signal of the sensor 1010. The setting unit 450 sets the target amount of current based on the actual amount of current, and may adjust a preset target amount of current. For example, the setting unit 450 may analyze whether a target resonator coupled to the source resonator 430 is present based on information of an amount of inflow current in a case in which a target resonator coupled to the source resonator 430 is present at a relatively short distance from the source resonator 430, and information of an amount of inflow current in a case in which a target resonator coupled to the source resonator 430 is present at a relatively long distance from the source resonator 430. The setting unit 450 may analyze a power reception state of the target resonator, and a coupling state between the source resonator 430 and the target resonator based on information of an amount of inflow current that may change based on the power reception state of the target resonator or the coupling state. The setting unit 450 may analyze an amount of residual energy of the source resonator 430 based on information of an amount of inflow current that may be affected by the amount of residual energy of the source resonator 430. The setting unit 450 may set the target amount of current, and adjust the preset target amount of current, based on the analyzed information.

Figure 12B:
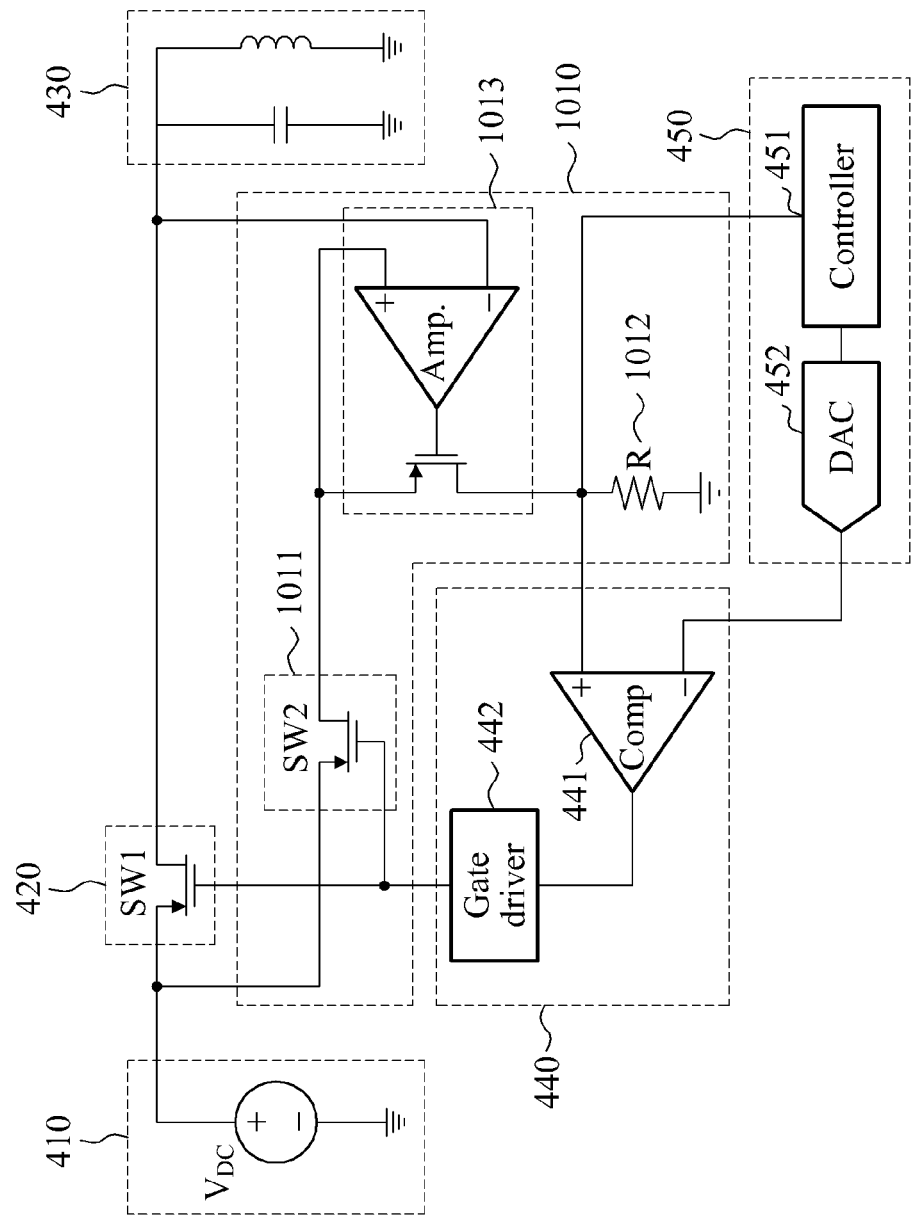

Referring to FIG. 12B, a voltage applied to one end of the sensing resistor R 1012 of the sensor 1010 is input into the controller 451 of the setting unit 450. Although not shown in FIG. 12B, the voltage applied to the one end of the sensing resistor R 1012 may be input into the controller 451 through an ADC. The controller 451 analyzes an actual amount of current flowing in the source resonator 430 based on the voltage applied to the one end of the sensing resistor R 1012, and dynamically sets a target amount of current based on the analyzed actual amount of current.

Figure 13A:
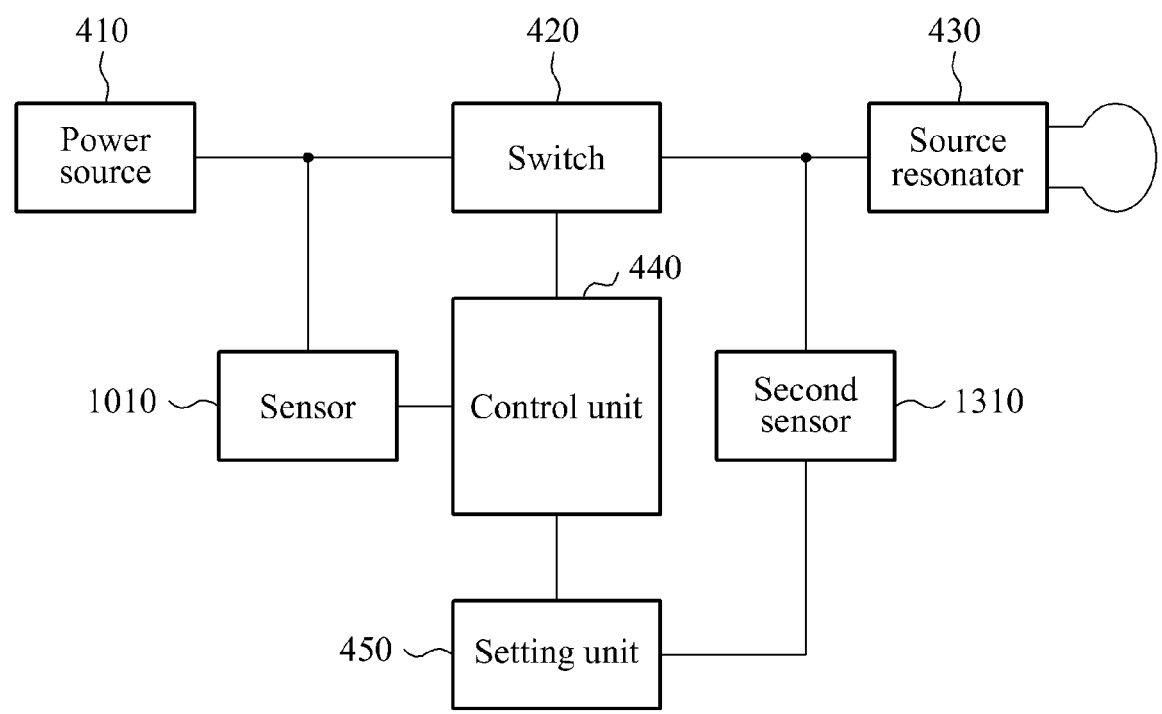

Referring to FIG. 13A, the wireless power transmission apparatus further includes a second sensor 1310. The second sensor 1310 senses a resonance waveform of the source resonator 430. For example, the second sensor 1310 may sense a voltage $V_{tx}$ of the source resonator 430 (e.g., a waveform of a voltage applied between both ends of an inductor) that may change over time. The setting unit 450 dynamically sets a target amount of current based on the resonance waveform of the source resonator 430 that is sensed by the second sensor 1310.

The setting unit 450 may analyze a feedback transmitted from the target resonator based on the resonance waveform of the source resonator 430. The resonance waveform of the source resonator 430 may include feedback information transmitted from the target resonator. For example, an amount of energy needed by a receiving end may be changed based on an application of the receiving end of the wireless power transmission apparatus. The receiving end may request an increase and a decrease in an amount of energy to be transmitted. Since an amount of received energy may be changed based on a distance between the source resonator 430 and the target resonator, the receiving end may transmit feedback information of the received energy. The setting unit 450 may dynamically control the amount of energy to be transmitted by dynamically setting the target amount of current based on the feedback information.

Figure 13B:
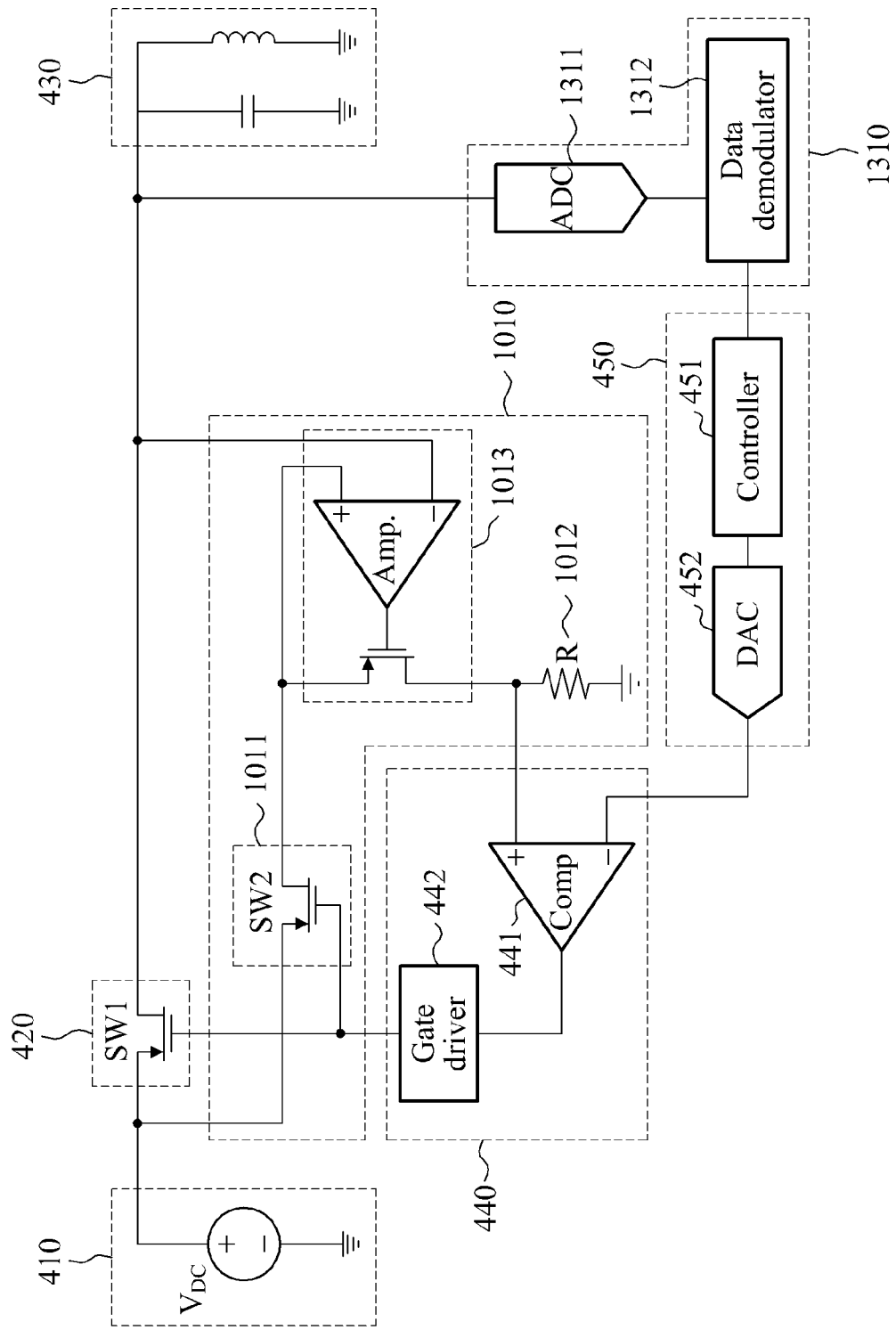

Referring to FIG. 13B, the second sensor 1310 includes an ADC 1311 and a data demodulator 1312. The ADC 1311 converts a voltage of the source resonator 430, which is an analog signal, into a digital signal. The data demodulator 1312 demodulates data, using the digital signal. In an example, the data demodulator 1312 may be implemented to be included in the controller 451 of the setting unit 450. The data demodulator 1312 transfers the demodulated data to the controller 451, and the controller 451 dynamically sets a target amount of current based on the demodulated data.

Figure 14A:
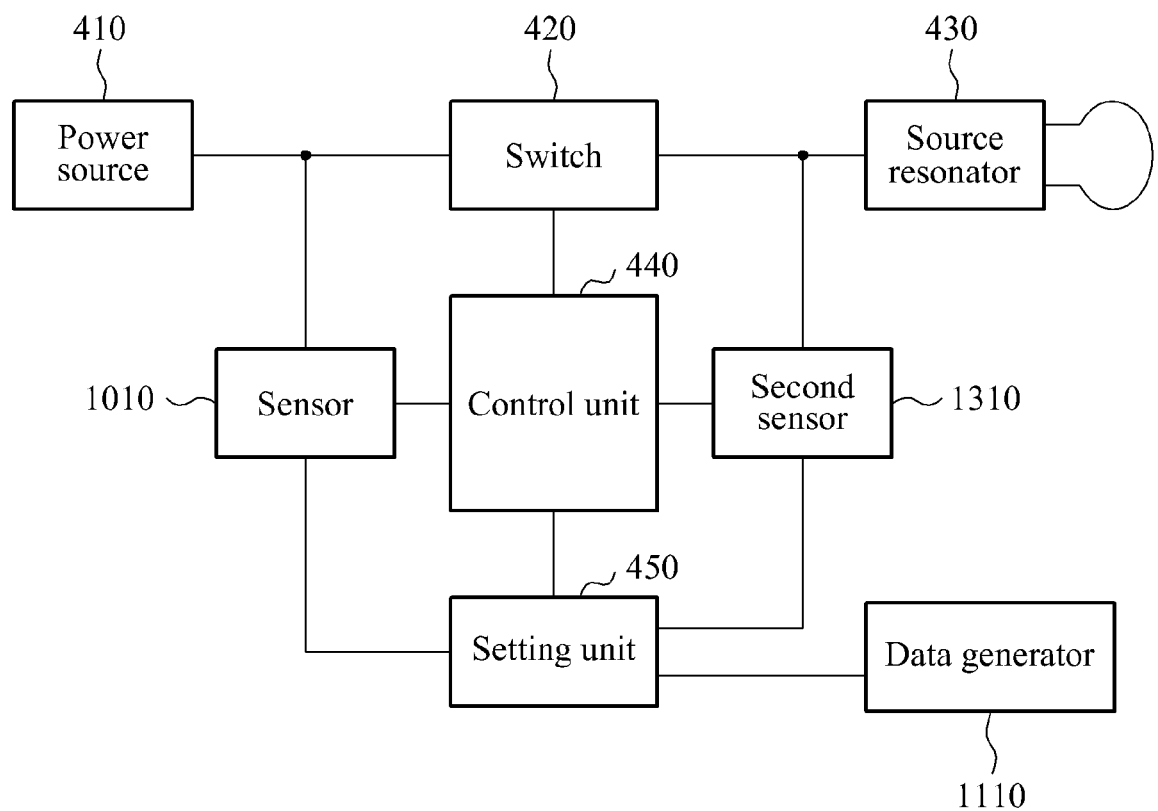

Referring to FIG. 14A, the setting unit 450 is connected to the sensor 1010, the data generator 1110, and the second sensor 1310. The setting unit 450 may dynamically set a target amount of current based on various combinations of input information. The setting unit 450 may determine whether a receiving end is present based on information sensed by the sensor 1010. When it is determined that a receiving end is absent, the setting unit 450 may operate in an idle mode to reduce power consumption. In the idle mode, the setting unit 450 may not perform energy charging. The setting unit 450 may determine whether a transition from the idle mode to an operation mode is to be performed after a predetermined time elapses. The setting unit 450 may perform energy charging after the predetermined time elapses, and determine whether a coupled receiving end is present based on the information sensed by the sensor 1010. When it is determined that a receiving end is present, the setting unit 450 may set the target amount of current based on data generated by the data generator 1110. The setting unit 450 may receive a signal fed back from the receiving end through the second sensor 1310. As an example, the receiving end may transmit a feedback signal to inform the setting unit 450 of a successful reception of data, using a target resonator. The setting unit 450 may set the target amount of current so that subsequent data may be transmitted after the feedback signal is received. The foregoing operation is provided as an example, and the operation of the setting unit 450 may be variously extended or modified.

Figure 14B:
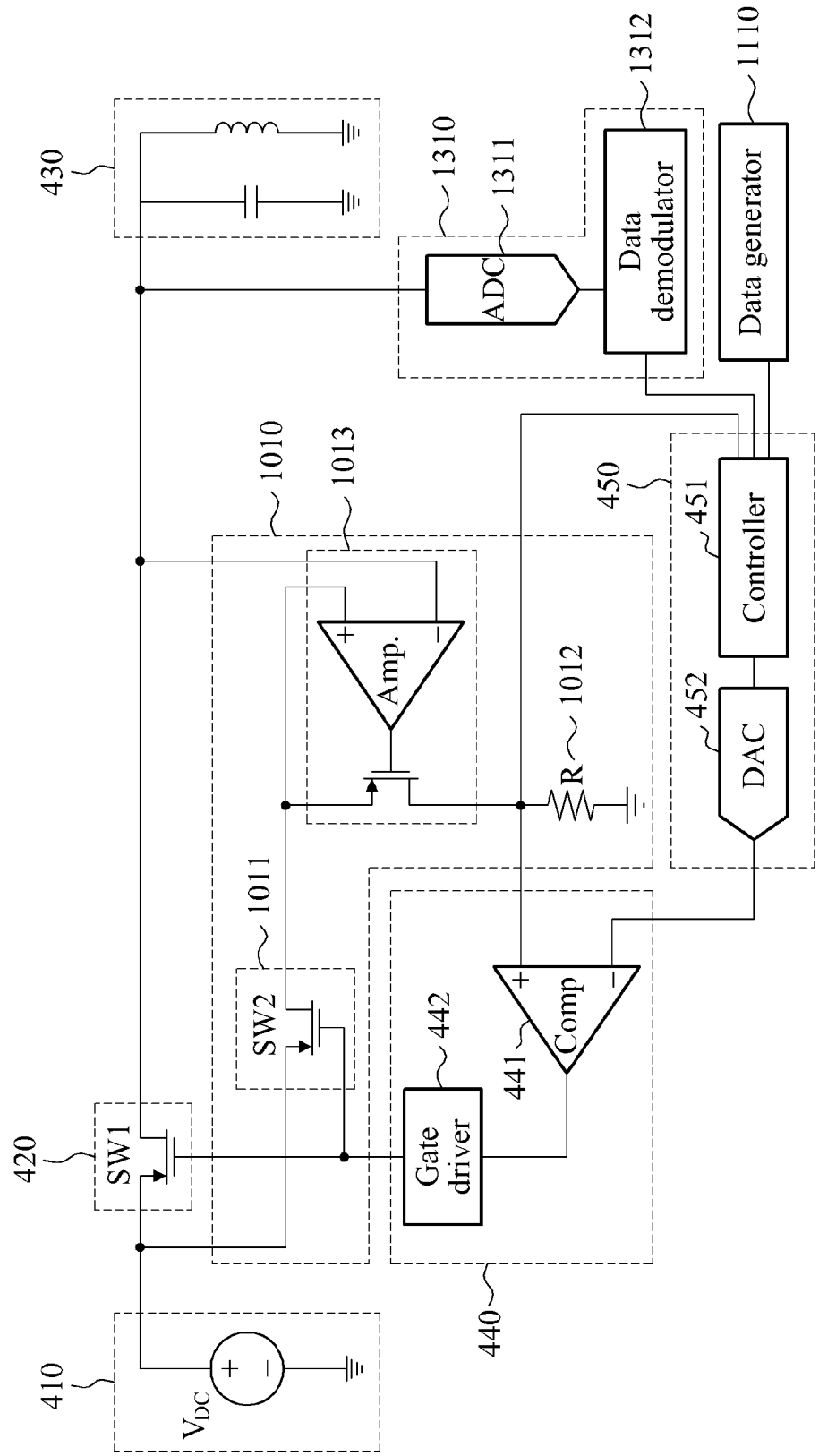

Referring to FIG. 14B, the controller 451 of the setting unit 450 may receive various items of input information from the sensor 1010, the data generator 1110, and the second sensor 1310. The descriptions provided with reference to FIGS. 1 through 14A may apply to each module illustrated in FIG. 14B, and thus, duplicated descriptions will be omitted for conciseness.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
   a resonator configured to transmit power through a resonance with another resonator;
   a switch configured to connect the resonator to a power source;
   a setting unit configured to dynamically set a target amount of current to flow in the resonator based on at least one of data to be transmitted to the another resonator, an actual amount of current flowing in the resonator and a resonance waveform of the resonator; and
   a control unit configured to control the switch based on the target amount of current.

2. The apparatus of claim 1, further comprising:
   a sensor configured to sense the actual amount of current flowing in the resonator, wherein the control unit is configured to control the switch by comparing the actual amount of current flowing in the resonator to the target amount of current set by the setting unit.

3. The apparatus of claim 1, wherein, to perform the dynamic setting, the setting unit is configured to:
   set the target amount of current based on the data to be transmitted to the other resonator.

4. The apparatus of claim 1, wherein, to perform the dynamic setting, the setting unit is configured to:
   set the target amount of current based on a charging and discharging cycle of the resonator.

5. The apparatus of claim 1, wherein,
   to perform the dynamic setting, the setting unit is configured to set a first target amount of current corresponding to first data in a first symbol duration, and set a second target amount of current corresponding to second data in a second symbol duration,
   the first symbol duration corresponds to a first charging and discharging cycle of the resonator, and
   the second symbol duration corresponds to a second charging and discharging cycle of the resonator.

6. The apparatus of claim 1, wherein, to perform the dynamic setting, the setting unit is further configured to:
   analyze any one or any combination of whether the other resonator is present, a power reception state of the other resonator, and an amount of residual energy of the resonator, based on the actual amount of current flowing in the resonator.

7. The apparatus of claim 1, wherein, to perform the dynamic setting, the setting unit is further configured to:
   analyze a feedback received from the other resonator based on the resonance waveform of the resonator.

8. The apparatus of claim 1, wherein, to perform the dynamic setting, the setting unit is configured to:
   set the target amount of current based on at least two of the resonance waveform of the resonator, the actual amount of current flowing in the resonator, and the data to be transmitted to the other resonator.

9. The apparatus of claim 1, wherein, to perform the dynamic setting, the setting unit is configured to:
   select one of predetermined candidate target amounts of current as the target amount of current.

10. An energy charging apparatus comprising:
    an inductor configured to store energy;
    a switch configured to connect the inductor to a power source;
    a setting unit configured to dynamically set a target amount of energy to be stored in the inductor based on at least one of data to be transmitted to the resonator, an actual amount of current flowing in the resonator and a resonance waveform of the resonator; and
    a control unit configured to control the switch based on the target amount of energy.

11. The apparatus of claim 10, further comprising:
    a sensor configured to sense the actual amount of current flowing in the inductor, wherein the control unit is configured to control the switch by comparing the actual amount of current flowing in the inductor to a target amount of current set by the setting unit to flow in a resonator that corresponds to the target amount of energy.

12. The apparatus of claim 10, wherein the inductor is included in a resonator configured to transmit power through a resonance with another resonator.

13. The apparatus of claim 10, wherein, to perform the dynamic setting, the setting unit is configured to:
    set the target amount of energy based on the data to be transmitted through the inductor.

14. The apparatus of claim 10, wherein, to perform the dynamic setting, the setting unit is configured to:
    set the target amount of energy based on the actual amount of current flowing in the inductor.

15. The apparatus of claim 10, wherein, to perform the dynamic setting, the setting unit is configured to:
    set the target amount of energy based on a waveform of a voltage applied between both ends of the inductor.

16. The apparatus of claim 10, wherein, to perform the dynamic setting, the setting unit is configured to:

set the target amount of energy based on at least two of a waveform of a voltage applied between both ends of the inductor, the actual amount of current flowing in the inductor, and the data to be transmitted through the inductor.

17. A method of controlling a wireless power transmission apparatus comprising a resonator configured to transmit power through a resonance with another resonator, the method comprising:

dynamically setting a target amount of current into flow into the resonator based on any one or any combination of a resonance waveform of the resonator, an actual amount of current flowing in the resonator, and data to be transmitted to the other resonator; and determining whether current is allowed to flow in the resonator based on a charging and discharging cycle of the resonator.

18. A non-transitory computer-readable storage medium storing a program comprising instructions to cause a computer to perform the method of claim 17.

19. An apparatus comprising:

a resonator configured to transmit power to another resonator; and a setting unit configured to dynamically set a target amount of current to flow in the resonator based on any one or any combination of data to be transmitted to the other resonator, an actual amount of current flowing in the resonator, and a resonance waveform of the resonator.

20. The apparatus of claim 19, further comprising:

a switch configured to connect the resonator to a power source; and a control unit configured to control the switch based on the target amount of current.

21. The apparatus of claim 19, further comprising:

a data generator configured to generate the data to be transmitted to the other resonator.

22. The apparatus of claim 19, further comprising:

a sensor connected in series to the resonator, and configured to sense the actual amount of current flowing in the resonator.

23. The apparatus of claim 19, further comprising:

a sensor configured to sense the resonance waveform of the resonator.

24. The apparatus of claim 19, further comprising:

a sensor connected in parallel to the resonator, and configured to sense the actual amount of current flowing in the resonator.

* * * * *